US012426058B2

(12) United States Patent
Park et al.

(10) Patent No.: US 12,426,058 B2
(45) Date of Patent: Sep. 23, 2025

(54) METHOD AND APPARATUS FOR PERIODIC DATA TRANSMISSION AND RECEPTION IN WIRELESS COMMUNICATION SYSTEM

(71) Applicant: Samsung Electronics Co., Ltd., Suwon-si (KR)

(72) Inventors: Sungjin Park, Suwon-si (KR); Younsun Kim, Suwon-si (KR); Hyunseok Ryu, Suwon-si (KR); Cheolkyu Shin, Suwon-si (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 431 days.

(21) Appl. No.: 17/970,825

(22) Filed: Oct. 21, 2022

(65) Prior Publication Data

US 2023/0137234 A1    May 4, 2023

(30) Foreign Application Priority Data

Oct. 27, 2021 (KR) ......................... 10-2021-0144909

(51) Int. Cl.
*H04W 72/04* (2023.01)
*H04W 72/23* (2023.01)

(52) U.S. Cl.
CPC .................. *H04W 72/23* (2023.01)

(58) Field of Classification Search
CPC ..... H04L 5/0044; H04L 5/0098; Y02D 30/70; H04W 72/0446; H04W 72/11; H04W 72/23
USPC ....................................................... 370/329
See application file for complete search history.

(56) References Cited

U.S. PATENT DOCUMENTS

| 2020/0092908 | A1  | 3/2020 | Li et al. |
| 2021/0160829 | A1* | 5/2021 | Park ................. H04L 1/1893 |
| 2022/0007399 | A1* | 1/2022 | Rastegardoost ...... H04L 5/0073 |
| 2022/0124783 | A1  | 4/2022 | Park et al. |
| 2022/0312412 | A1  | 9/2022 | Lee et al. |

(Continued)

FOREIGN PATENT DOCUMENTS

| KR | 10-2022-0051798 A | 4/2022 |
| WO | 2020/222598 A1    | 11/2020 |
| WO | 2020/227864 A1    | 11/2020 |

OTHER PUBLICATIONS

3GPP TS 38.331 V16.5.0, 3rd Generation Partnership Project; Technical Specification Group Radio Access Network; NR; Radio Resource Control (RRC) protocol specification (Release 16), Jun. 2021.

(Continued)

*Primary Examiner* — Robert J Lopata
(74) *Attorney, Agent, or Firm* — Jefferson IP Law, LLP

(57) ABSTRACT

A communication method and system for converging a 5th-Generation (5G) communication system for supporting higher data rates beyond a 4th-Generation (4G) system with a technology for Internet of Things (IoT) are provided. The disclosure may be applied to intelligent services based on the 5G communication technology and the IoT-related technology, such as smart home, smart building, smart city, smart car, connected car, health care, digital education, smart retail, security and safety services. The disclosure relates to an effective grant-free based data transmission/reception method.

12 Claims, 16 Drawing Sheets

(56) References Cited

U.S. PATENT DOCUMENTS

2023/0041764 A1* 2/2023 Park .................. H04L 1/1812
2024/0260023 A1* 8/2024 Park .................. H04W 72/51

OTHER PUBLICATIONS

Apple Inc., Potential enhancements for XR in Rel-18, R1-2110519, 3GPP TSG RAN WG1 Meeting #106bis-e, Oct. 20, 2021, e-Meeting.

International Search Report dated Feb. 3, 2023, issued in International Application No. PCT/KR2022/016302.

* cited by examiner

METHOD AND APPARATUS FOR PERIODIC DATA TRANSMISSION AND RECEPTION IN WIRELESS COMMUNICATION SYSTEM

CROSS-REFERENCE TO RELATED APPLICATION(S)

This application is based on and claims priority under 35 U.S.C. § 119 (a) of a Korean patent application number 10-2021-0144909, filed on Oct. 27, 2021, in the Korean Intellectual Property Office, the disclosure of which is incorporated by reference herein in its entirety.

BACKGROUND

1. Field

The disclosure relates to a grant-free data transmission method in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long-term evolution (LTE) System'. The 5G communication system is considered to be implemented in higher frequency (millimeter wave (mmWave)) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The 5G communication system is developing to provide various services, and as various services are provided, a method for efficiently providing such services is required. Accordingly, research on grant-free based communication is being actively conducted.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for efficiently using radio resources and performing grant-free based data transmission/reception. In particular, a downlink grant-free based data transmission/reception method and an uplink grant-free data transmission/reception method will be described.

According to the disclosed embodiments, radio resources can be efficiently used and various services can be efficiently provided to users according to priorities.

Additional aspects will be set forth in part in the description which follows and, in part, will be apparent from the description, or may be learned by practice of the presented embodiments.

In accordance with an aspect of the disclosure, a method performed by a terminal in a communication system is provided. The method includes receiving, from a base station, a semi-persistent scheduling (SPS) configuration for aperiodic data packets or data packets that do not correspond to a period of a multiple of a symbol, the SPS configuration including information on a period of a SPS physical downlink shared channel (PDSCH), receiving, from the base station, downlink control information for activation of the SPS configuration, identifying a resource for the SPS PDSCH based on the information on the SPS PDSCH, and receiving, from the base station, data packet on the resource.

In accordance with another aspect of the disclosure, a method performed by a base station in a communication system is provided. The method includes transmitting, to a terminal, a semi-persistent scheduling (SPS) configuration for aperiodic data packets or data packets that do not correspond to a period of a multiple of a symbol, the SPS configuration including information on a period of a SPS physical downlink shared channel (PDSCH), transmitting, to the terminal, downlink control information for activation of the SPS configuration, and transmitting, to the terminal, data packet on a resource for the SPS PDSCH, wherein the resource for the SPS PDSCH is based on the information on the SPS PDSCH.

Other aspects, advantages, and salient features of the disclosure will become apparent to those skilled in the art from the following detailed description, which, taken in conjunction with the annexed drawings, discloses various embodiments of the disclosure

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
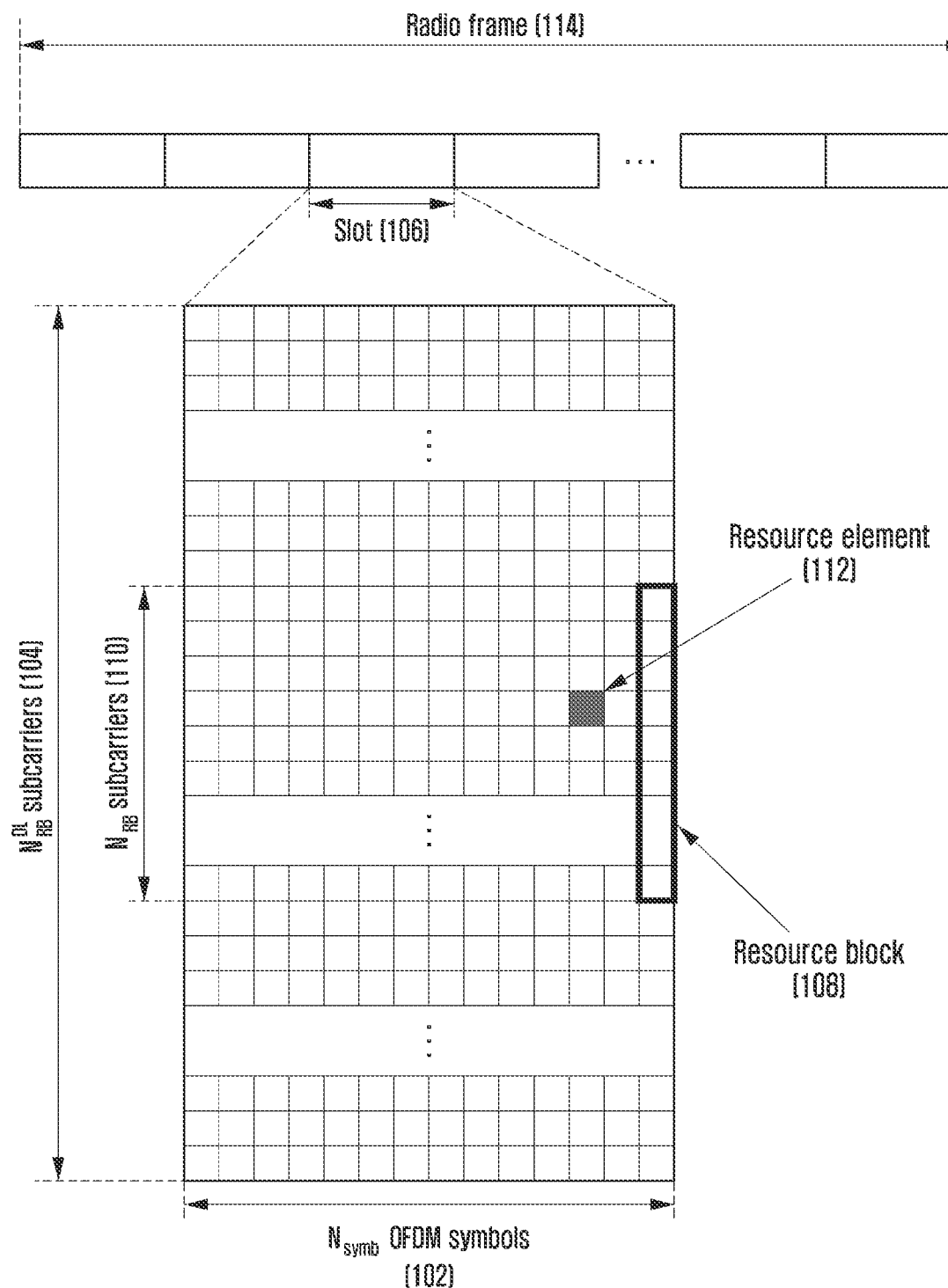
FIG. 1 is a diagram illustrating a transmission structure of a time-frequency domain, which is a radio resource domain of a 5G or new radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments, descriptions related to technical contents well-known in the art to which the disclosure pertains and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 1102.16e, and the like, as well as typical voice-based services. Moreover, as 5th generation wireless communication systems, communication standards for 5G or new radio (NR) systems are under development.

As a typical example of the broadband wireless communication system, the 5G or NR system employs an orthogonal frequency division multiplexing (OFDM) scheme in a downlink (DL) and an uplink (UL). More specifically, a cyclic-prefix OFDM (CP-OFDM) scheme is employed in a downlink, and a discrete Fourier transform spreading OFDM (DFT-S-OFDM) scheme, as well as the CP-OFDM scheme, is employed in an uplink. The uplink indicates a radio link through which a terminal transmits data or control signals to a base station, and the downlink indicates a radio link through which the base station transmits data or control signals to the terminal. The above multiple access scheme may separate data or control information of respective users by allocating and operating time-frequency resources for transmitting the data or control information for each user so as to avoid overlapping each other, that is, so as to establish orthogonality.

The 5G or NR system employs a hybrid automatic repeat request (HARQ) method for retransmitting the corresponding data in the physical layer when a decoding failure occurs in the initial transmission. In the HARQ method, when the receiver fails to correctly decode data, the receiver transmits information (negative acknowledgment (NACK)) notifying the transmitter of decoding failure so that the transmitter can retransmit the data in the physical layer. The receiver combines the data retransmitted by the transmitter with the previously unsuccessful data to improve data reception performance. Also, when the receiver correctly decodes the data, the receiver may transmit information (acknowledgement (ACK)) notifying the transmitter of decoding success so that the transmitter can transmit new data.

Meanwhile, a new 5G communication NR (New Radio access technology) system is being designed so that various services can be freely multiplexed in time and frequency resources, and accordingly, a waveform, numerology, and a reference signal may be dynamically or freely allocated according to the needs of a corresponding service. Meanwhile, in the 5G or NR system, the types of supported services may be divided into categories such as enhanced mobile broadband (eMBB), massive machine type communications (mMTC), and ultra-reliable and low-latency communications (URLLC). The eMBB is a high-speed transmission of high-capacity data, the mMTC is a service that minimizes terminal power and connects multiple terminals, and the URLLC is a service that aims for high reliability and low latency. Different requirements may be applied according to the type of service applied to the terminal.

The terms as used herein are terms defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of a gNode B (gNB), an eNode B (eNB), a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. The following description of the disclosure will be directed to the NR system by way of example, but the disclosure is not limited thereto and embodiments of the disclosure may be applied to various communication systems having similar technical backgrounds or channel types. Furthermore, based on determinations by those skilled in the art, the embodiments of the disclosure may also be applied to other communication systems through some modifications without significantly departing from the scope of the disclosure.

As used herein, the conventional terms "physical channels" and "signal" may be interchangeably used with the terms "data" and "control signal". For example, a physical downlink physical channel (PDSCH) is a channel over which data is transmitted, but the PDSCH may be referred to as "data" in the disclosure. That is, transmission/reception of a PDSCH may be understood as transmission/reception of data.

In the disclosure, higher signaling (which may be interchangeably used with "higher signal", "higher-layer signal", or "higher-layer signaling") refers to a method in which a base station transmits a signal to a terminal by using a downlink data channel in a physical layer or a terminal transmits a signal to a base station by using an uplink data channel in a physical layer, and may also be referred to as "RRC signaling" or a "MAC control element (CE)".

Recently, as research on the 5G communication system is in progress, various methods for scheduling communication with a terminal are being discussed. Accordingly, an efficient scheduling and data transmission/reception method in consideration of the characteristics of the 5G communication system is required. Accordingly, in order to provide a plurality of services to a user in a communication system, a method and an apparatus using the same are required to provide each service within the same time period according to the characteristics of the corresponding service.

The terminal needs to receive separate control information from the base station in order to transmit or receive data to the base station. However, in the case of periodically generated traffic or a service type requiring low delay and/or high reliability, it may be possible to transmit or receive data without the separate control information. This transmission method is referred to as a data transmission method based on a configured grant (which may be mixed with a configured grant, grant-free, or configured scheduling) in the disclosure. The method of receiving or transmitting data after receiving the data transmission resource configuration and related information configured through the control information is called the first signal transmission/reception type, and a method of transmitting or receiving data based on information configured in advance without control information may be referred to as a second signal transmission/reception type. For the second signal transmission/reception type, a preconfigured resource area exists periodically, and in these areas, there are an uplink type 1 grant, which is a method configured only with a higher layer signal, and an uplink type 2 grant (or semi-persistent scheduling (SPS)), which is a method configured with a combination of a higher level signal and an L1 signal (that is, downlink control information (DCI)). In the case of the UL type 2 grant (or SPS), some information is a higher level signal, and whether or not actual data is transmitted is determined by the L1 signal. Here, the L1 signal may be largely divided into a signal indicating activation of a resource configured to a higher level and a signal indicating release of the activated resource again.

An extended reality (XR) service refers to a service that requires a high data transfer rate like eMBB and at the same time requires low latency and high reliability like URLLC. In addition, the XR traffic may be a non-periodically generated traffic in addition to the periodically generated data like the existing voice. For example, when information on virtual space reality is transmitted/received in real time, event-based data may be generated, and data transmission speed requirements may vary accordingly. Therefore, an aperiodic data transmission/reception technique reflecting such XR traffic characteristics may be required.

The disclosure includes a method for determining a semi-static HARQ-ACK codebook and a dynamic HARQ-ACK codebook corresponding to a DL SPS transmission period having an aperiodic or less than 1 slot, and a method for transmitting HARQ-ACK information. In addition, the disclosure also includes a method for uplink (UL) configured grant (CG) transmission in addition to the DL SPS. In addition, the disclosure includes a configuration method for supporting aperiodic transmission of DL SPS and UL CG.

FIG. 1 is a diagram illustrating a transmission structure of a time-frequency domain, which is a radio resource domain of a 5G or NR system according to an embodiment of the disclosure.

Referring to FIG. 1, in a radio resource domain, a horizontal axis indicates a time domain and a vertical axis indicates a frequency domain. The minimum transmission unit in the time domain is an OFDM symbol, and $N_{symb}$ OFDM symbols 102 are gathered to form one slot 106. The length of the subframe may be defined as 1.0 ms, and the radio frame 114 may be defined as 10 ms. The minimum transmission unit in the frequency domain is a subcarrier, and the bandwidth of the entire system transmission bandwidth may be composed of a total of $N^{DL}_{RB}$ subcarriers 104. However, these specific numerical values may be variably applied depending on the system.

The basic unit of the time-frequency resource area is a resource element (RE) 112 and may be represented by an OFDM symbol index and a subcarrier index. A resource block (RB) 108 may be defined as $N_{RB}$ consecutive subcarriers 110 in the frequency domain.

In general, the minimum transmission unit of data is an RB unit. In the 5G or NR system, $N_{symb}$=14, and $N_{RB}$=12, in general. The data rate increases in proportion to the number of RBs scheduled for the UE. In the 5G or NR system, in the case of a frequency division duplex (FDD) system that divides downlink and uplink by frequency, the downlink transmission bandwidth and the uplink transmission bandwidth may be different from each other. The channel bandwidth represents an RF bandwidth corresponding to a system transmission bandwidth. Table 1 below shows the correspondence between the system transmission bandwidth and the channel bandwidth defined in the LTE system, which is the 4$^{th}$ generation wireless communication before the 5G or NR system. For example, an LTE system having a 10 megahertz (MHz) channel bandwidth has a transmission bandwidth of 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

In the 5G or NR system, the channel bandwidth wider than the channel bandwidth of LTE presented in Table 1 may be employed. Table 2 shows the correspondence between the system transmission bandwidth, the channel bandwidth, and the subcarrier spacing (SCS) in the 5G or NR system.

TABLE 2

| SCS | Channel bandwidth BW$_{Channel}$ [MHz] | | | | | | | | | |
|---|---|---|---|---|---|---|---|---|---|---|
| [kHz] | 5 | 10 | 15 | 20 | 25 | 40 | 50 | 60 | 80 | 100 |
| Maximum | 15 | 25 | 52 | 79 | 106 | 133 | 216 | 270 | N.A. | N.A. | N.A. |
| Transmission bandwidth $N_{RB}$ | 30 | 11 | 24 | 38 | 51 | 65 | 106 | 133 | 162 | 217 | 273 |
| | 60 | N.A. | 11 | 18 | 24 | 31 | 51 | 65 | 79 | 107 | 135 |

In the 5G or NR system, scheduling information for downlink data or uplink data is transmitted from a base station to a terminal through downlink control information (DCI). The DCI is defined according to various formats, and whether it is scheduling information (UL grant) for uplink data or scheduling information (DL grant) for downlink data, whether it is a compact DCI with a small size of control information, whether spatial multiplexing using multiple antennas is applied, whether DCI for power control, etc. may be different according to each format. For example, DCI format 1_1, which is scheduling control information (DL grant) for downlink data, may include at least one of the following control information.

Carrier indicator: This indicates which frequency carrier is transmitted.

DCI format indicator: This is an indicator for distinguishing whether the corresponding DCI is for downlink or uplink.

Bandwidth Part (Bandwidth part, hereinafter BWP) indicator: This indicates which BWP is transmitted.

Frequency domain resource allocation: This indicates an RB in a frequency domain allocated for data transmission. The resource to be expressed is determined according to the system bandwidth and resource allocation method.

Time domain resource allocation: This indicates in which OFDM symbol in which slot the data-related channel is to be transmitted.

VRB-to-PRB mapping: This indicates how to map a virtual RB (VRB) index and a physical RB (Physical RB, hereinafter PRB) index.

Modulation and coding scheme (hereinafter referred to as MCS): This indicates a modulation scheme and a coding rate used for data transmission. That is, this indicates a coding rate value that can inform quadrature phase shift keying (QPSK), 16 quadrature amplitude modulation (16QAM), 64QAM, or 256QAM along with transport block size (TBS) and channel coding information.

Code block group (CBG) transmission information: This indicates information on which CBG is transmitted when CBG retransmission is configured.

HARQ process number: This indicates the process number of HARQ.

New data indicator: This indicates whether HARQ initial transmission or retransmission.

Redundancy version: This indicates a redundancy version of HARQ.

Physical uplink control channel (PUCCH) resource indicator: This indicates a PUCCH resource for transmitting ACK/NACK information for downlink data.

PDSCH-to-HARQ_feedback timing indicator: This indicates a slot in which ACK/NACK information for downlink data is transmitted.

Transmit power control (TPC) command for PUCCH: This indicates a transmit power control command for PUCCH, which is an uplink control channel.

In the case of PUSCH transmission, time domain resource assignment may be transmitted by information about a slot in which the PUSCH is transmitted, and the start OFDM symbol position S in the corresponding slot and the number of OFDM symbols L to which the PUSCH is mapped. The aforementioned S may be a relative position from the start of the slot, L may be the number of consecutive OFDM symbols, and S and L may be determined from the start and length indicator value (SLIV) defined as follows.

If (L−1)≤7 then
SLIV=14*(L−1)+S
else
SLIV=14*(14−L+1)+(14−1−S)
where 0<L≤14−S

In the 5G or NR system, the terminal may generally receive a table including information on the SLIV value, the PUSCH mapping type, and the slot in which the PUSCH is transmitted in one row through RRC configuration. Thereafter, in the time domain resource allocation of DCI, an index value in a configured table is indicated, so that the base station may transmit the SLIV value, the PUSCH mapping type, and information on the slot in which the PUSCH is transmitted to the terminal. This method is also applied to PDSCH.

Specifically, when the base station indicates to the terminal the time resource allocation field index m included in the DCI for scheduling the PDSCH, this indicates a combination of DRMS Type A position information corresponding to m+1 in a table indicating time domain resource allocation information, PDSCH mapping type information, slot index K0, data resource start symbol S, and data resource allocation length L. As an example, Table 3 below is a table including PDSCH time domain resource allocation information based on normal cyclic prefix.

TABLE 3

| Row index | dmrs-TypeA-Position | PDSCH mapping type | K$_0$ | S | L |
|---|---|---|---|---|---|
| 1 | 2 | Type A | 0 | 2 | 12 |
| | 3 | Type A | 0 | 3 | 11 |
| 2 | 2 | Type A | 0 | 2 | 10 |
| | 3 | Type A | 0 | 3 | 9 |
| 3 | 2 | Type A | 0 | 2 | 9 |
| | 3 | Type A | 0 | 3 | 8 |
| 4 | 2 | Type A | 0 | 2 | 7 |
| | 3 | Type A | 0 | 3 | 6 |
| 5 | 2 | Type A | 0 | 2 | 5 |
| | 3 | Type A | 0 | 3 | 4 |
| 6 | 2 | Type B | 0 | 9 | 4 |
| | 3 | Type B | 0 | 10 | 4 |
| 7 | 2 | Type B | 0 | 4 | 4 |
| | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In Table 3, dmrs-typeA-Position is a field indicating a symbol position at which DMRS is transmitted in one slot indicated by a system information block (SIB), which is one of terminal common control information. Possible values for this field are 2 or 3. When the number of symbols constituting one slot is 14 in total and the first symbol index is 0, 2 means the third symbol and 3 means the fourth symbol.

The PDSCH mapping type is information indicating the location of the DMRS in the scheduled data resource region. When the PDSCH mapping type is A, DMRS is always transmitted/received at the symbol position determined by dmrs-typeA-Position regardless of the allocated data time domain resource. When the PDSCH mapping type is B, the DMRS location is always the first symbol among allocated data time domain resources. In other words, PDSCH mapping type B does not use dmrs-typeA-Position information.

In Table 3, $K_0$ denotes an offset between a slot index to which a PDCCH through which DCI is transmitted belongs and a slot index to which a PDSCH or PUSCH scheduled in the corresponding DCI belongs. For example, when the slot index of the PDCCH is n, the slot index of the PDSCH or the PUSCH scheduled by the DCI of the PDCCH is $n+K_0$. In Table 3, S means a start symbol index of a data time domain resource within one slot. The possible range of S values is usually 0 to 13 on a Normal Cyclic Prefix basis. In Table 1, L means a data time domain resource interval length within one slot. Possible values of L range from 1 to 14.

In the 5G or NR system, PUSCH mapping types are defined as type A and type B. In the PUSCH mapping type A, the first OFDM symbol among DMRS OFDM symbols is located in the second or third OFDM symbol in the slot. In the PUSCH mapping type B, the first OFDM symbol among DMRS OFDM symbols is located in the first OFDM symbol in the time domain resource allocated for PUSCH transmission. The above-described PUSCH time domain resource allocation method may be equally applicable to PDSCH time domain resource allocation.

DCI may be transmitted on a physical downlink control channel (PDCCH) (or control information, hereinafter may be used interchangeably) that is a downlink physical control channel through channel coding and modulation process. In general, DCI is scrambled with a specific radio network temporary identifier (RNTI, or terminal identifier) independently for each terminal, cyclic redundancy check (CRC) is added, is channel-coded, and then, each DCI is configured as an independent PDCCH and transmitted. The PDCCH is mapped and transmitted to a control resource set (CORE-SET) configured for the terminal.

The downlink data may be transmitted on a physical downlink shared channel (PDSCH), which is a physical channel for downlink data transmission. The PDSCH may be transmitted after the control channel transmission period, and scheduling information such as a specific mapping position and a modulation scheme in the frequency domain is determined based on DCI transmitted through the PDCCH.

Among the control information constituting DCI, through the MCS, the base station notifies the UE of the modulation scheme applied to the PDSCH to be transmitted and the size of the data to be transmitted (transport block size (TBS)). In an embodiment, the MCS may consist of 5 bits or more or fewer bits. The TBS corresponds to the size before the channel coding for error correction is applied to data (transport block (TB)) to be transmitted by the base station.

The transport block (TB) in the disclosure may include a medium access control (MAC) header, a MAC CE, one or more MAC service data units (SDUs), and padding bits. Alternatively, the TB may indicate a data unit or MAC protocol data unit (PDU) that is transmitted from the MAC layer to the physical layer.

The modulation schemes supported by the 5G or NR system are quadrature phase shift keying (QPSK), 16 quadrature amplitude modulation (16QAM), 64QAM, and 256QAM, and each modulation order ($Q_m$) corresponds to 2, 4, 6, 8. That is, in the case of QPSK modulation, 2 bits per symbol, in the case of 16QAM modulation, 4 bits per OFDM symbol, in the case of 64QAM modulation, 6 bits per symbol can be transmitted, and in the case of 256QAM modulation, 8 bits per symbol can be transmitted.

When the PDSCH is scheduled by the DCI, HARQ-ACK information indicating whether decoding for the PDSCH succeeds or fails is transmitted from the terminal to the base station through the PUCCH. This HARQ-ACK information is transmitted in the slot indicated by the PDSCH-to-HARQ feedback timing indicator included in the DCI for scheduling the PDSCH, and the values respectively mapped to 1 to 3 bit PDSCH-to-HARQ feedback timing indicator are configured by higher layer signals as shown in Table 4. When the PDSCH-to-HARQ feedback timing indicator indicates k, the UE transmits HARQ-ACK information after k slots in slot n in which the PDSCH is transmitted, that is, in n+k slots.

TABLE 4

| PDSCH-to-HARQ feedback timing indicator | | | |
|---|---|---|---|
| 1 bit | 2 bits | 3 bits | Number of slots k |
| '0' | '00' | '000' | $1^{st}$ value provided by dl-DataToUL-ACK |
| '1' | '01' | '001' | $2^{nd}$ value provided by dl-DataToUL-ACK |
| | '10' | '010' | $3^{rd}$ value provided by dl-DataToUL-ACK |
| | '11' | '011' | $4^{th}$ value provided by dl-DataToUL-ACK |
| | | '100' | $5^{th}$ value provided by dl-DataToUL-ACK |
| | | '101' | $6^{th}$ value provided by dl-DataToUL-ACK |
| | | '110' | $7^{th}$ value provided by dl-DataToUL-ACK |
| | | '111' | $8^{th}$ value provided by dl-DataToUL-ACK |

When the PDSCH-to-HARQ feedback timing indicator is not included in the DCI format 1_1 for scheduling the PDSCH, the UE transmits HARQ-ACK information in slot n+k according to the value k configured for HARQ-ACK information as higher layer signaling. When the terminal transmits HARQ-ACK information on the PUCCH, the terminal transmits to the base station using the PUCCH resource determined based on the PUCCH resource indicator included in the DCI for scheduling the PDSCH. In this case, the ID of the PUCCH resource mapped to the PUCCH resource indicator may be configured through higher layer signaling.

Figure 2:
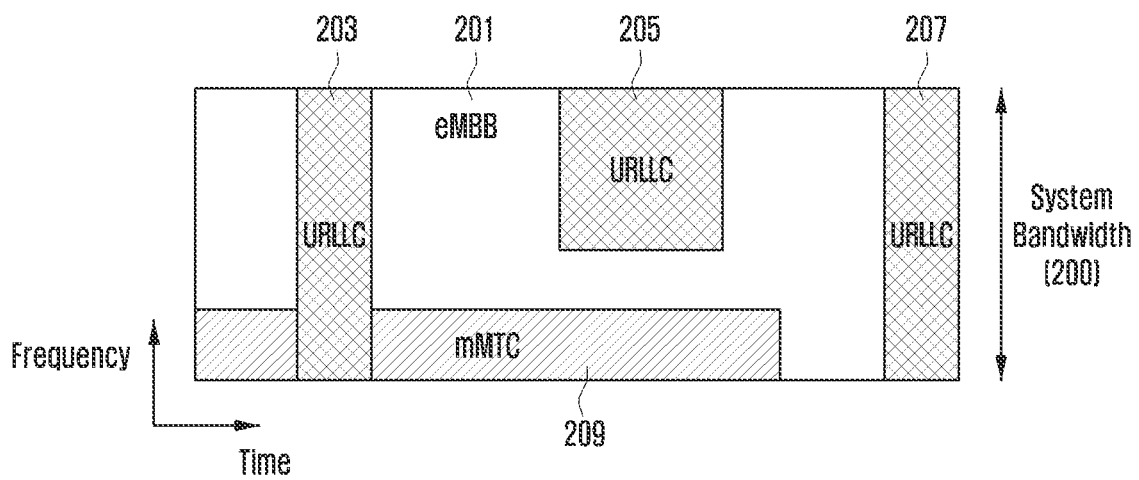
FIG. 2 is a diagram illustrating an example of allocating data for enhanced mobile broadband (eMBB), ultra-reliable and low-latency communications (URLLC), and massive machine type communications (mMTC) in a time-frequency resource domain in a 5G or NR system according to an embodiment of the disclosure.

FIG. 2 is a diagram illustrating an example of allocating data for eMBB, URLLC, and mMTC in a time-frequency resource domain in a 5G or NR system according to an embodiment of the disclosure.

Referring to FIG. 2, data for eMBB, URLLC, and mMTC may be allocated in the entire system frequency band 200. When the eMBB data 201 and the mMTC data 209 are allocated in a specific frequency band and the URLLC data 203, 205, and 207 are generated and transmission is required, the transmitter may transmit the URLLC data 203, 205, and 207 without transmitting or emptying a portion to which the eMBB data 201 and the mMTC data 209 are already allocated. Since it is necessary to reduce the delay time of URLLC among the above-described services, URLLC data may be allocated and transmitted to a part of a resource to which eMBB or mMTC data is allocated.

When URLLC data is additionally allocated and transmitted in the resource to which the eMBB data is allocated, the eMBB data may not be transmitted in the overlapping time-frequency resource, and thus the transmission performance of the eMBB data may be lowered. That is, eMBB data transmission failure may occur due to URLLC allocation.

Figure 3:
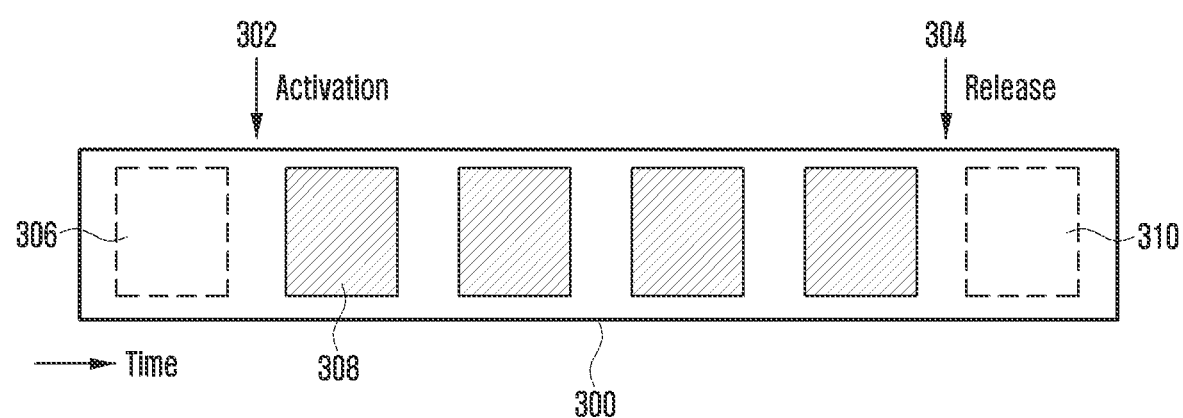
FIG. 3 is a diagram illustrating a grant-free transmission/ reception operation according to an embodiment of the disclosure.

FIG. 3 is a diagram illustrating a grant-free transmission/reception operation according to an embodiment of the disclosure.

There is a first signal transmission/reception type in which the terminal performs downlink data reception according to information set only as a higher layer signal from the base station, and a second signal transmission/reception type in which downlink data reception is performed according to transmission configuration information indicated by a higher layer signal and an L1 signal. In the disclosure, a method of operating a terminal for the second signal transmission/reception type is mainly described. In the disclosure, SPS, which is the second signal type for downlink data reception, means grant-free-based PDSCH transmission in downlink. In the DL SPS, the terminal may receive grant-free based PDSCH transmission through higher signal configuration and additional configuration information indicated by DCI.

DL SPS is a method in which the base station periodically transmits/receives downlink data information to the terminal based on information configured as higher signaling without scheduling specific downlink control information to the terminal, and may be applied in voice over internet protocol (VOIP) or periodically occurring traffic situations. Alternatively, resource configuration for the DL SPS may be periodic, but data actually generated may be aperiodic. In this case, since the terminal does not know whether actual data is generated from the periodically set resource, it may be possible to perform the following two types of operations.

Method 3-1: For the periodically set DL SPS resource region, the UE transmits HARQ-ACK information to the base station for the uplink resource region corresponding to the corresponding resource region for the demodulation and/or decoding (hereinafter, demodulation/decoding) result of the received data.

Method 3-2: For the periodically set DL SPS resource region, when at least signal detection for DMRS or data is successfully performed, the terminal transmits HARQ-ACK information to the base station for the uplink resource region corresponding to the resource region corresponding to the demodulation/decoding result for the received data.

Method 3-3: When the UE succeeds in decoding/demodulating for the periodically set DL SPS resource region (i.e., ACK is generated), the terminal transmits HARQ-ACK information to the base station for the uplink resource region corresponding to the corresponding resource region for the demodulation/decoding result of the received data.

In method 3-1, even if the base station does not actually transmit downlink data for the DL SPS resource region, the UE always transmits HARQ-ACK information to the uplink resource region corresponding to the DL SPS resource region. In method 3-2, since the base station does not know when to transmit data to the DL SPS resource region, the terminal transmits HARQ-ACK information in a situation in which the terminal knows whether to transmit or receive data, such as when the terminal succeeds in demodulation reference signal (DMRS) detection or CRC detection succeeds. In method 3-3, the HARQ-ACK information is transmitted to the uplink resource region corresponding to the DL SPS resource region only when the UE succeeds in data demodulation/decoding.

Among the above-described methods, it may be possible for the terminal to always support only one or support two or more. It may be possible to select one of the above methods as a 3GPP standard specification or a higher signal. For example, when method 3-1 is indicated by a higher signal, the UE may be able to perform transmission of HARQ-ACK information for the corresponding DL SPS based on method 3-1. Alternatively, it may be possible to select one method according to the DL SPS higher configuration information. For example, if the transmission period is n slots or more in the DL SPS higher configuration information, the terminal may apply method 3-1, and vice versa, it may be possible for the terminal to apply method 3-3. In this example, the transmission period is mentioned as an example of a criterion for selecting one method, but it may be sufficiently possible to be applied by the applied MCS table, DMRS configuration information, resource configuration information, and the like.

The UE performs downlink data reception in a downlink resource region configured for higher signaling. It may be possible to perform activation or release of the downlink resource region configured by the higher signaling by L1 signaling.

Referring to FIG. 3, the UE configures the next DL SPS configuration information from the higher-level signal.

Periodicity: DL SPS transmission period
nrofHARQ-Processes: The number of HARQ processes configured for DL SPS
n1PUCCH-AN: HARQ resource configuration information for DL SPS
mcs-Table: MCS table configuration information applied to DL SPS In the disclosure, all DL SPS configuration information may be configured for each Pcell or Scell, and may also be configured for each frequency band section (bandwidth part (BWP)). In addition, it may be possible to configure one or more DL SPSs for each BWP for each specific cell.

Referring to FIG. 3, the UE determines the grant-free transmission/reception configuration information 300 through reception of a higher signal for the DL SPS. After the UE receives the DCI indicating activation (302), data transmission/reception may be possible for the configured resource region (308), and data transmission/reception cannot be performed for the resource region (306) before receiving the DCI. In addition, the UE cannot receive data for the resource region (310) after receiving the DCI indicating release (304).

The UE verifies the DL SPS assignment PDCCH when both of the following two conditions are satisfied for SPS scheduling activation or release.

Condition 1: When the CRC bit of the DCI format transmitted in the PDCCH is scrambled with the CS-RNTI configured by higher signaling Condition 2: When the New Data Indicator (NDI) field for the activated transport block is configured to 0

When some of the fields constituting the DCI format transmitted through the DL SPS assignment PDCCH are the same as those shown in Table 5 or Table 6, the UE determines that the information in the DCI format is valid activation or effective release of the DL SPS. For example, when the UE detects the DCI format including the information shown in Table 5, the UE determines that the DL SPS is activated. As another example, when the UE detects the DCI format including the information shown in Table 6, the UE determines that the DL SPS is released.

When some of the fields constituting the DCI format transmitted to the DL SPS assignment PDCCH are not the same as those shown in Table 5 (special field configuration information for activating DL SPS) or Table 6 (special field configuration information for releasing DL SPS), the UE determines that the DCI format is detected as a non-matching CRC.

TABLE 5

|  | DCI format 1_0 | DCI format 1_1 |
|---|---|---|
| HARQ process number | set to all '0's | set to all '0's |
| Redundancy version | set to '00' | For the enabled transport block: set to '00' |

TABLE 6

| Field | DCI format 1_0 |
|---|---|
| HARQ process number | set to all '0's |
| Redundancy version | set to '00' |
| Modulation and coding scheme | set to all '1's |
| Resource block assignment | set to all '1's |

When the UE receives the PDSCH without receiving the PDCCH or receives the PDCCH indicating SPS PDSCH release, the UE generates a corresponding HARQ-ACK information bit. In addition, at least in Rel-15 NR, the UE does not expect to transmit HARQ-ACK information(s) for reception of two or more SPS PDSCHs on one PUCCH resource. In other words, at least in Rel-15 NR, the UE includes only HARQ-ACK information for one SPS PDSCH reception in one PUCCH resource.

The above-mentioned Tables 5 to 6 may be possible fields in a situation where only one DL SPS can be set for each cell and for each BWP. The DCI field for activating (or releasing) each DL SPS resource in a situation in which a plurality of DL SPSs are configured for each cell and for each BWP may vary.

In the disclosure, not all DCI formats described in Tables 5 and 6 are used to activate or release the DL SPS resource, respectively. For example, DCI format 1_0 and DCI format 1_1 used to schedule the PDSCH may be utilized for activating the DL SPS resource. For example, DCI format 1_0 used to schedule the PDSCH may be used for releasing DL SPS resources.

Figure 4:
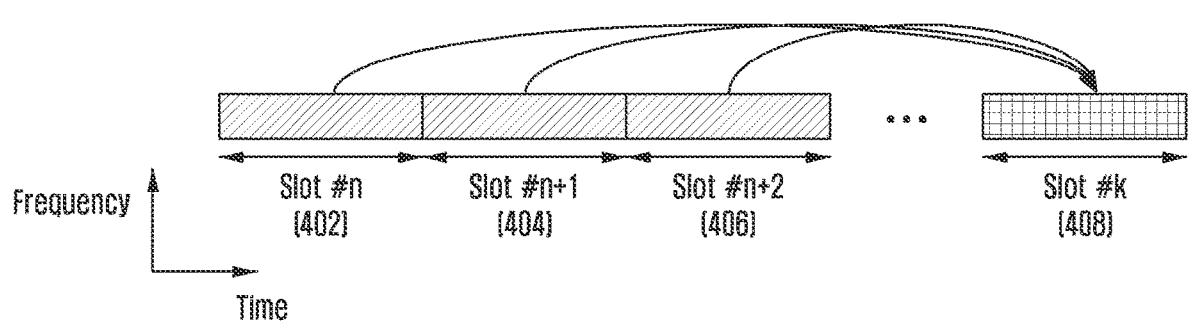
FIG. 4 is a diagram illustrating a method of configuring a semi-static hybrid automatic repeat request-acknowledgement (HARQ-ACK) codebook in an NR system according to an embodiment of the disclosure.

FIG. 4 is a diagram illustrating a method of configuring a semi-static HARQ-ACK codebook in an NR system according to an embodiment of the disclosure.

In a situation where the number of HARQ-ACK PUCCHs that the UE can transmit in one slot is limited to one, when the UE receives a semi-static HARQ-ACK codebook higher configuration, the UE reports HARQ-ACK information for PDSCH reception or SPS PDSCH release included in the HARQ-ACK codebook transmitted in the slot indicated by the value of the PDSCH-to-HARQ_feedback timing indicator in DCI format 1_0 or DCI format 1_1. The UE reports the HARQ-ACK information bit value in the HARQ-ACK codebook transmitted in the slot not indicated by the PDSCH-to-HARQ feedback timing indicator field in DCI format 1_0 or DCI format 1_1 as NACK. If the UE reports only HARQ-ACK information for one SPS PDSCH release or one PDSCH reception in MAC cases for candidate PDSCH reception, and the report is scheduled by DCI format 1_0 including information indicating that the counter DAI field is 1 in the Pcell, the UE determines one HARQ-ACK codebook for the corresponding SPS PDSCH release or the corresponding PDSCH reception.

Otherwise, the HARQ-ACK codebook determination method according to the method described above follows.

Assuming that the set of PDSCH reception candidate cases in the serving cell c is $M_{A,c}$, $M_{A,c}$ can be obtained by the following [pseudo-code 1] steps.

[Start Pseudo-Code 1]
Step 1: Initialize j to 0 and $M_{A,c}$ to empty. Initialize k, which is the HARQ-ACK transmission timing index, to 0.

Step 2: Configure R as a set of rows in a table including slot information to which PDSCH is mapped, start symbol information, number of symbols or length information. If the PDSCH-capable mapping symbol indicated by each value of R is set as the UL symbol according to the DL and UL configuration configured in the higher layer, the corresponding row is deleted from R.

Step 3-1: If the UE can receive one unicast PDSCH in one slot and R is not an empty set, one is added to the set $M_{A,c}$.

Step 3-2: If the terminal can receive more than one PDSCH for unicast in one slot, count the number of PDSCHs that can be allocated to different symbols in the calculated R, and add the corresponding number to $M_{A,c}$.

Step 4: Start again from step 2 by incrementing k by 1.
[End of Pseudo-Code 1]

Taking the above-described pseudo-code 1 as an example of FIG. 4, in order to perform HARQ-ACK PUCCH transmission in slot #k (408), all slot candidates capable of PDSCH-to-HARQ-ACK timing that can indicate slot #k (408) are considered. In FIG. 4, it is assumed that HARQ-ACK transmission is possible in slot #k (408) by the PDSCH-to-HARQ-ACK timing combination available only for PDSCHs scheduled in slot #n (402), slot #n+1 (404) and slot #n+2 (406). In addition, the maximum number of schedulable PDSCHs for each slot is derived in consideration of time domain resource configuration information of each schedulable PDSCH in slots 402, 404, and 406 and information indicating whether a symbol in the slot is downlink or uplink. For example, assuming that maximum scheduling is possible for two PDSCHs in slot 402, three PDSCHs in slot 404, and two PDSCHs in slot 406, the maximum number of PDSCHs included in the HARQ-ACK codebook transmitted in slot 408 is 7 in total. This is called the cardinality of the HARQ-ACK codebook.

In a specific slot, the step 3-2 is described through the following Table 7 (Default PDSCH time domain resource allocation A for normal CP).

TABLE 7

| Row index | dmrs-TypeA-Position | PDSCH mapping type | $K_0$ | S | L | Ending | Order |
|---|---|---|---|---|---|---|---|
| 1 | 2 | Type A | 0 | 2 | 12 | 13 | 1x |
|  | 3 | Type A | 0 | 3 | 11 | 13 | 1x |
| 2 | 2 | Type A | 0 | 2 | 10 | 11 | 1x |
|  | 3 | Type A | 0 | 3 | 9 | 11 | 1x |
| 3 | 2 | Type A | 0 | 2 | 9 | 10 | 1x |
|  | 3 | Type A | 0 | 3 | 8 | 10 | 1x |
| 4 | 2 | Type A | 0 | 2 | 7 | 8 | 1x |
|  | 3 | Type A | 0 | 3 | 6 | 8 | 1x |

TABLE 7-continued

| Row index | dmrs-TypeA-Position | PDSCH mapping type | $K_0$ | S | L | Ending | Order |
|---|---|---|---|---|---|---|---|
| 5 | 2 | Type A | 0 | 2 | 5 | 6 | 1x |
|   | 3 | Type A | 0 | 3 | 4 | 6 | 1x |
| 6 | 2 | Type B | 0 | 9 | 4 | 12 | 2x |
|   | 3 | Type B | 0 | 10 | 4 | 13 | 3 |
| 7 | 2 | Type B | 0 | 4 | 4 | 7 | 1x |
|   | 3 | Type B | 0 | 6 | 4 | 9 | 2 |
| 8 | 2, 3 | Type B | 0 | 5 | 7 | 11 | 1x |
| 9 | 2, 3 | Type B | 0 | 5 | 2 | 6 | 1x |
| 10 | 2, 3 | Type B | 0 | 9 | 2 | 10 | 2x |
| 11 | 2, 3 | Type B | 0 | 12 | 2 | 13 | 3x |
| 12 | 2, 3 | Type A | 0 | 1 | 13 | 13 | 1x |
| 13 | 2, 3 | Type A | 0 | 1 | 6 | 6 | 1x |
| 14 | 2, 3 | Type A | 0 | 2 | 4 | 5 | 1 |
| 15 | 2, 3 | Type B | 0 | 4 | 7 | 10 | 1x |
| 16 | 2, 3 | Type B | 0 | 8 | 4 | 11 | 2x |

Table 7 is a time resource allocation table in which the terminal operates as a default before the terminal receives time resource allocation with a separate RRC signal. For reference, the PDSCH time resource allocation value is determined by dmrs-TypeA-Position, which is a common RRC signal, in addition to separately indicating the row index value as RRC. In Table 7, the Ending column and the Order column are separately added values for convenience of explanation, and it may be possible that they do not actually exist. The meaning of the Ending column means the end symbol of a scheduled PDSCH, and the Order column means a code position value located in a specific codebook in the semi-static HARQ-ACK codebook. The table is applied to time resource allocation applied in DCI format 1_0 of the common search region of the PDCCH.

In order for the UE to determine the HARQ-ACK codebook by calculating the maximum number of non-overlapping PDSCHs within a specific slot, the UE performs the following steps.

Step 1: Search for the PDSCH allocation value that ends first in the slot among all the rows of the PDSCH time resource allocation table. In Table 7, it can be seen that row index 14 ends first. This is marked as 1 in the order column. And other row indexes overlapping the corresponding row index 14 by at least one symbol are marked as 1x in the order column.

Step 2: Search for the PDSCH allocation value that ends first among the remaining row indices that are not displayed in the Order column. In Table 7, a row with a row index of 7 and a dmrs-TypeA-Position value of 3 corresponds to this. Other row indices overlapping the corresponding row index by at least one symbol are indicated as 2x in the order column.

Step 3: Repeat step 2 and increase the order value. As an example, the PDSCH allocation value that ends first among the row indices not indicated in the order column in Table 7 is searched. In Table 7, a row with a row index of 6 and a dmrs-TypeA-Position value of 3 corresponds to this. And other row indices overlapping the corresponding row index by at least one symbol are marked as 3x in the order column.

Step 4: When order is displayed in all row indices, it ends. The size of the corresponding order is the maximum number of PDSCHs that can be scheduled without time overlap within the corresponding slot. Scheduling without time overlap means that different PDSCHs are scheduled by TDM.

In the order column of Table 7, the maximum value of order means the HARQ-ACK codebook size of the corresponding slot, and the order value means the HARQ-ACK codebook point at which the HARQ-ACK feedback bit for the corresponding scheduled PDSCH is located. For example, row index 16 of Table 7 means that it exists at the second code position in the size 3 semi-static HARQ-ACK codebook. If the UE transmitting the HARQ-ACK feedback sets the set of PDSCH reception candidate cases (occasion for candidates PDSCH receptions) in the serving cell c as $M_{A,c}$, the $M_{A,c}$ can be obtained by [pseudo-code 1] or [pseudo-code 2] steps. The $M_{A,c}$ may be used to determine the number of HARQ-ACK bits to be transmitted by the UE. Specifically, the HARQ-ACK codebook may be configured using the cardinality of the $M_{A,c}$ set.

As another example, considerations for determining the semi-static HARQ-ACK codebook (or type 1 HARQ-ACK codebook) may be as follows.

a) on a set of slot timing values $K_1$ associated with the active UL BWP
  a) If the UE is configured to monitor PDCCH for DCI format 1_0 and is not configured to monitor PDCCH for DCI format 1_1 on serving cell c, $K_1$ is provided by the slot timing values {1, 2, 3, 4, 5, 6, 7, 8} for DCI format 1_0
  b) If the UE is configured to monitor PDCCH for DCI format 1_1 for serving cell c, $K_1$ is provided by dl-DataToUL-ACK for DCI format 1_1 b) on a set of row indexes R of a table that is provided either by a first set of row indexes of a table that is provided by PDSCH-TimeDomainResourceAllocationList in PDSCH-ConfigCommon or by Default PDSCH time domain resource allocation A [6, TS 38.214], or by the union of the first set of row indexes and a second set of row indexes, if provided by PDSCH-TimeDomainResourceAllocationList in PDSCH-Config, associated with the active DL BWP and defining respective sets of slot offsets $K_0$, start and length indicators SLIV, and PDSCH mapping types for PDSCH reception as described in [6, TS 38.214]

c) on the ratio $2^{\mu_{DL}-\mu_{UL}}$ between the downlink SCS configuration $\mu_{DL}$ and the uplink SCS configuration $\mu_{UL}$ provided by subcarrierSpacing in BWP-Downlink and BWP-Uplink for the active DL BWP and the active UL BWP, respectively d) if provided, on TDD-UL-DL-ConfigurationCommon and TDD-UL-DL-ConfigDedicated as described in Subclause 11.1.

As another example, the pseudo-code for determining the HARQ-ACK codebook may be as follows.

[Start Pseudo-Code 2]

For the set of slot timing values 1, the UE determines a set of $M_{A,c}$ occasions for candidate PDSCH receptions or SPS PDSCH releases according to the following pseudo-code. A location in the Type-1 HARQ-ACK codebook for HARQ-ACK information corresponding to a SPS PDSCH release is same as for a corresponding SPS PDSCH reception.

Set j=O—index of occasion for candidate PDSCH reception or SPS PDSCH release

Set B = Ø
Set $M_{A,c}$ = Ø
Set c($K_1$) to the cardinality of set $K_1$

```
    Set k =0 – index of slot timing values K₁,ₖ, in descending order of the slot
timing values, in set K₁ for serving cell C
    while k<c(K₁)
        if mod(n_U – K₁,ₖ + 1, max(2^{μUL−μDL}, 1 ) ) = 0
    Set n_D = 0 – index of a DL slot within an UL slot
    while n_D < max (2^{μUL−μDL}, 1 )
        Set R to the set of rows
        Set c(R) to the cardinality of R
        Set r=0 – index of row in set R
        if slot n_U starts at a same time as or after a slot for an
active DL BWP change on serving cell c or an active UL BWP change on the PCell and
slot ⌊ (n_U−K₁,ₖ) * 2^{μDL−μUL} ⌋ + n_D is before the slot for the active DL BWP change on
serving cell c or the active UL BWP change on the PCell
            continue;
        else
            while r<c(R)
                if the UE is provided TDD-UL-DL-
ConfigurationCommon or TDD-UL-DL-ConfigDedicated and, for each slot from slot
⌊ (n_U−K₁,ₖ) * 2^{μDL−μUL} ⌋ +n_D−N_PDSCH^{repeat}+1 to slot ⌊ (n_U−K₁,ₖ) * 2^{μDL−μUL} ⌋ + n_D, at least one symbol of
the PDSCH time resource derived by row r is configured as UL where K₁,ₖ is the k-th
slot timing value in set K₁,
                R = R/r,
            end if
            r=r+1;
        end while
        if the UE does not indicate a capability to receive
more than one unicast PDSCH per slot and R ≠ ∅ ,
            M_{A,c} = M_{A,c} ∪ j;
            j=j+1;
            The UE does not expect to receive SPS
PDSCH release and unicast PDSCH in a same slot;
        else
            Set c(R) to the cardinality of R
            Set m to the smallest last OFDM symbol
index, as determined by the SLIV, among all rows of R
            while R ≠ ∅
                Set r=0
                while r<c(R)
                    if S≤m for start OFDM symbol
index S for row r
                        b_{r,k,n_D} = j; – index of occasion
for candidate PDSCH reception or SPS PDSCH release associated with row r
                        R = R/r;
                        B = B ∪ b_{r,k,n_D};
                    end if
                    r=r+1;
                end while
                M_{A,c} = M_{A,c} ∪ j
                j=j+1;
                Set m to the smallest last OFDM
symbol index among all rows of R;
            end while
        end if
    end if
    n_D = n_D + 1;
    end while
end if
k = k + 1;
end while
[End pseudo-code 2]
```

In pseudo-code 2, the location of the HARQ-ACK codebook containing HARQ-ACK information for DCI indicating DL SPS release is based on the location at which the DL SPS PDSCH is received. For example, when the start symbol in which the DL SPS PDSCH is transmitted starts from the 4th OFDM symbol based on the slot and has a length of 5 symbols, the location of HARQ-ACK information including the DL SPS release indicating release of the corresponding SPS is determined in the following way. It is assumed that a PDSCH having a length of 5 symbols starting from the 4$^{th}$ OFDM symbol of the slot in which the DL SPS release is transmitted is mapped, and the location of the corresponding HARQ-ACK information is determined through the PDSCH-to-HARQ-ACK timing indicator and the PUCCH resource indicator included in the control information indicating the DL SPS release.

As another example, when the start symbol in which the DL SPS PDSCH is transmitted starts from the 4th OFDM symbol based on the slot and has a length of 5 symbols, the location of the HARQ-ACK information including the DL SPS release indicating release of the corresponding SPS is determined in the following way. It is assumed that the PDSCH having a length of 5 symbols starting from the 4$^{th}$ OFDM symbol of the slot indicated by the time domain resource allocation (TDRA) of DCI, which is a DL SPS release, is mapped, and the location of the corresponding HARQ-ACK information is determined through the PDSCH-to-HARQ-ACK timing indicator and the PUCCH resource indicator included in the control information indicating the DL SPS release.

Figure 5:
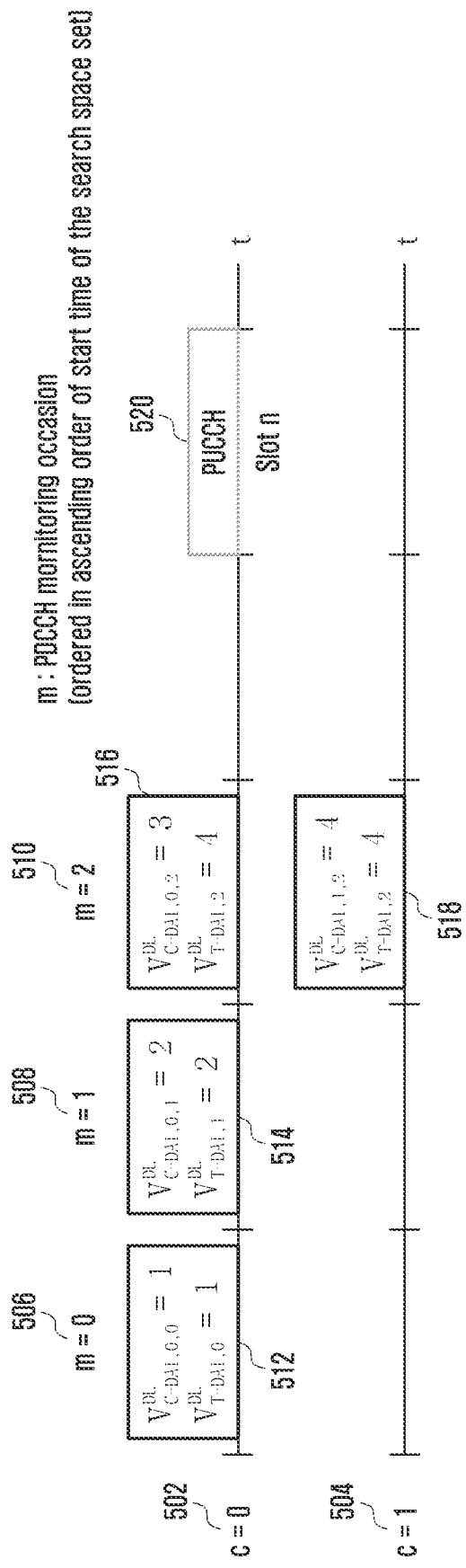
FIG. 5 is a diagram illustrating a method of configuring a dynamic HARQ-ACK codebook in an NR system according to an embodiment of the disclosure.

FIG. 5 is a diagram illustrating a method of configuring a dynamic HARQ-ACK codebook in an NR system according to an embodiment of the disclosure.

Referring to FIG. 5, the terminal transmits HARQ-ACK information transmitted within one PUCCH in the corresponding slot n, based on the PDSCH-to-HARQ feedback timing value for PUCCH transmission of HARQ-ACK information in slot n for PDSCH reception or SPS PDSCH release and K0, which is transmission slot location information of PDSCH scheduled in DCI format 1_0 or 1_1. Specifically, for transmitting the above-described HARQ-ACK information, the terminal determines the HARQ-ACK codebook of the PUCCH transmitted in the slot determined by the PDSCH-to-HARQ_feedback timing and K0, based on the DAI included in the DCI indicating the PDSCH or SPS PDSCH release.

The DAI is composed of Counter DAI and Total DAI. The Counter DAI is information indicating the location in the HARQ-ACK codebook of HARQ-ACK information corresponding to the PDSCH scheduled in DCI format 1_0 or DCI format 1_1. Specifically, the value of counter DAI in DCI format 1_0 or 1_1 informs the cumulative value of PDSCH reception or SPS PDSCH release scheduled by DCI format 1_0 or DCI format 1_1 in a specific cell c. The above-described cumulative value is configured based on the PDCCH monitoring occasion in which the scheduled DCI exists and the serving cell.

The Total DAI is a value indicating the size of the HARQ-ACK codebook. Specifically, the value of Total DAI means the total number of previously scheduled PDSCH or SPS PDSCH releases including a time point at which DCI is scheduled. The Total DAI is a parameter used when the HARQ-ACK information in the serving cell c also includes HARQ-ACK information for the PDSCH scheduled in another cell including the serving cell c in a carrier aggregation (CA) situation. In other words, there is no Total DAI parameter in a system operating with one cell.

An example of the operation of the DAI is shown in FIG. 5. FIG. 5 illustrates changes in the values of Counter DAI (C-DAI) and Total DAI (T-DAI) indicated by the DCI discovered for each PDCCH monitoring occasion configured for each carrier when the terminal transmits the HARQ-ACK codebook selected based on the DAI on the PUCCH 520 in the nth slot of carrier 0 (502) in a situation in which two carriers are configured. First, in the DCI searched for at m=0 (506), C-DAI and T-DAI indicate a value (512) of 1. In the DCI searched for at m=1 (508), C-DAI and T-DAI indicate a value (514) of 2. In the DCI searched for at carrier 0 (c=0 (502)) of m=2 (510), C-DAI indicates a value (516) of 3. In the DCI searched for at carrier 1 (c=1 (504)) of m=2 (510), C-DAI indicates a value (518) of 4. In this case, in 516 and 518, when carriers 0 and 1 are scheduled on the same monitoring occasion, T-DAI is all indicated as 4.

Referring to FIGS. 4 and 5, the HARQ-ACK codebook determination is performed in a situation that only one PUCCH containing HARQ-ACK information is transmitted in one slot. This is called mode 1. As an example of the method in which one PUCCH transmission resource is determined within one slot, when the PDSCHs scheduled in different DCIs are multiplexed into one HARQ-ACK codebook and transmitted within the same slot, the PUCCH resource selected for HARQ-ACK transmission is determined as the PUCCH resource indicated by the PUCCH resource indicator field indicated in the DCI that last scheduled the PDSCH. That is, the PUCCH resource indicated by the PUCCH resource indicator field indicated in the DCI scheduled before the DCI is ignored.

In the following description, it may be assumed that two or more PUCCHs containing HARQ-ACK information can be transmitted within one slot. This is called mode 2. The UE may be capable of operating only mode 1 (transmitting only one HARQ-ACK PUCCH in one slot) or mode 2 (transmitting one or more HARQ-ACK PUCCHs in one slot). Alternatively, the terminal supporting both mode 1 and mode 2 may be possible to configure the base station to operate in only one mode by higher signaling or to implicitly determine mode 1 and mode 2 by DCI format, RNTI, DCI specific field value, scrambling, or the like. For example, the PDSCH scheduled in DCI format A and HARQ-ACK information associated therewith are based on mode 1, and the PDSCH scheduled in DCI format B and HARQ-ACK information associated therewith are based on mode 2.

Whether the above-described HARQ-ACK codebook is semi-static in FIG. 4 or dynamic in FIG. 5 is determined by the RRC signal.

Figure 6:
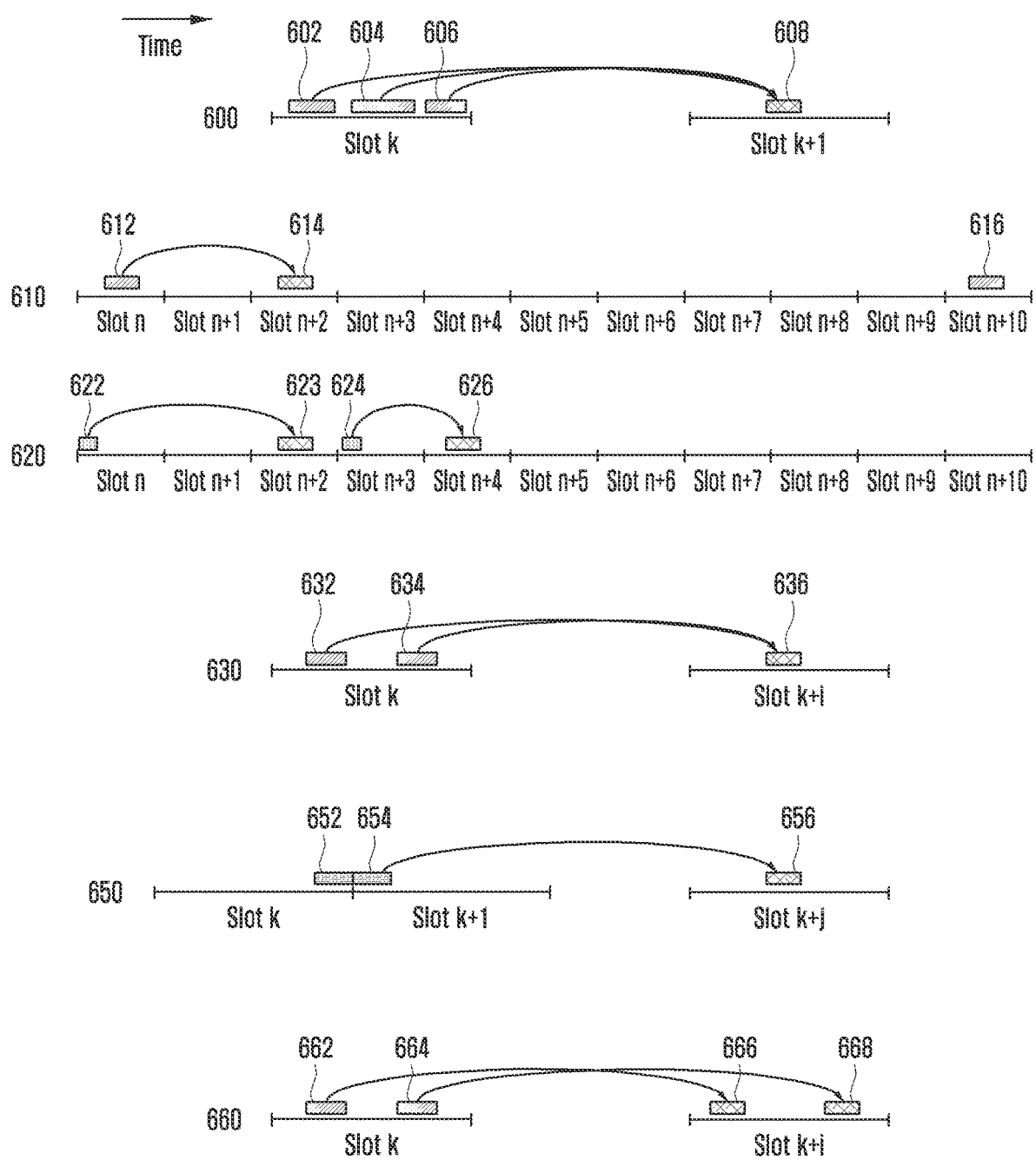
FIG. 6 is a diagram illustrating a HARQ-ACK transmission process for a downlink (DL) semi-persistent scheduling (SPS) according to an embodiment of the disclosure.

FIG. 6 is a diagram illustrating a HARQ-ACK transmission process for a DL SPS according to an embodiment of the disclosure.

Referring to FIG. 6, 600 shows a situation in which the maximum receivable PDSCHs 602, 604, and 606 are mapped to slot k without overlapping in terms of time resources. For example, when the PDSCH-to-HARQ feedback timing indicator is not included in the DCI format for scheduling the PDSCH, the terminal transmits the HARQ-ACK information 608 in the slot k+1 according to the 1 value set as the higher layer signaling for the HARQ-ACK information. Accordingly, the size of the semi-static HARQ-ACK codebook of slot k+1 is equal to the maximum number of transmittable PDSCHs in slot k, and may be 3.

In addition, when HARQ-ACK information is 1 bit for each PDSCH, the HARQ-ACK codebooks of 600 to 608 of FIG. 6 will consist of a total of 3 bits of [X, Y, Z], X may be HARQ-ACK information for PDSCH 602, Y may be HARQ-ACK information for PDSCH 604, and Z may be HARQ-ACK information for PDSCH 606. If PDSCH reception is successful, the corresponding information will be mapped to ACK, otherwise it will be mapped to NACK. In addition, when the actual DCI does not schedule the corresponding PDSCH, the UE reports NACK. Specifically, the location (which can be understood as the position of the HARQ-ACK bit on the HARQ-ACK codebook hereinafter) of the HARQ-ACK codebook located according to the SLIV of the PDSCH that can be scheduled in DCI may vary, and may be determined by Table 7 or [pseudo code 1] or [pseudo code 2].

In 610 of FIG. 6, HARQ-ACK transmission is shown in a situation in which DL SPS is activated. In Rel-15 NR, the minimum period of the DL SPS is 10 ms, and in 610, the length of one slot is 1 ms in the 15 kHz subcarrier interval, so that the SPS PDSCH 612 will be transmitted in slot n, and then the SPS PDSCH 616 will be transmitted in slot n+10.

After the base station informs the UE of the period for the SPS, HARQ-ACK transmission resource information, MCS table configuration, and the number of HARQ processes as a higher signal to the UE, the base station informs the frequency resource, the time resource, the MCS value, etc. according to information included in the DCI format indicating the corresponding SPS activation. The PUCCH resource through which HARQ-ACK information is transmitted may also be configured as a higher signal, and the PUCCH resource has the following properties.

With or without Hopping

PUCCH format (start symbol, symbol length, etc.)

Here, the MCS table setting and HARQ-ACK transmission resource information may not exist. When HARQ-ACK transmission resource information is present, Rel-15 NR supports PUCCH format 0 or 1 that can transmit up to 2 bits. However, in a later release, PUCCH format 2, 3 or 4 of 2 bits or more can be sufficiently supported.

Because the HARQ-ACK transmission resource information is included in the DL SPS higher signal configuration, the UE may be able to ignore the PUCCH resource indicator included in the DCI format indicating DL SPS activation. Alternatively, the PUCCH resource indicator field itself may not be included in the corresponding DCI format. On the other hand, when the HARQ-ACK transmission resource information is not included in the DL SPS higher signal configuration, the UE transmits HARQ-ACK information corresponding to the DL SPS in the PUCCH resource determined by the PUCCH resource indicator of the DCI format for activating the DL SPS. In addition, the difference between the slot in which the SPS PDSCH is transmitted and the slot in which the corresponding HARQ-ACK information is transmitted is determined by the value indicated by the PDSCH-toHARQ_feedback timing indicator of the DCI format for activating the DL SPS, or follows a specific value previously configured as a higher signal in the absence of the indicator.

For example, as in 610 of FIG. 6, when the PDSCH-to-HARQ_feedback timing indicator is 2, the HARQ-ACK information for the SPS PDSCH 612 transmitted in the slot n is transmitted through the PUCCH 614 in the slot n+2. In addition, the resource of the PUCCH through which the corresponding HARQ-ACK information is transmitted may be configured as a higher layer signal or may be determined by the L1 signal indicating DL SPS activation. In addition, if it is assumed that up to three PDSCHs can be received as in 600 of FIG. 6 and the time resource of PDSCH 612 is the same as that of PDSCH 604, the HARQ-ACK codebook for the SPS PDSCH 612 transmitted to the PUCCH 614 is located in the $Y^{th}$ among [X Y Z].

If a DCI indicating DL SPS release is transmitted, the UE needs to transmit HARQ-ACK information for the DCI to the base station. However, in the case of a semi-static HARQ-ACK codebook, the size of the HARQ-ACK codebook and its position are determined by the slot interval (PDSCH-to-HARQ_feedback timing) between the time resource region to which the PDSCH is allocated and the PDSCH and the HARQ-ACK indicated by the L1 signal or higher signal as described above in the disclosure. Therefore, when transmitting the HARQ-ACK for DCI indicating DL SPS release using a semi-static HARQ-ACK codebook, a specific rule is required rather than arbitrarily determining a location in the HARQ-ACK codebook, and in Rel-15 NR, the location of HARQ-ACK information for DCI indicating DL SPS release is mapped identically to the transmission resource region of the corresponding DL SPS PDSCH.

As an example, 620 of FIG. 6 shows a situation in which a DCI 622 indicating release of an activated DL SPS PDSCH is transmitted in slot n. When the PDSCH-to-HARQ_feedback timing indicator included in the DCI 622 format indicates 2, HARQ-ACK information for the DCI 622 will be transmitted to the PUCCH 623 of slot n+2, and the position in the HARQ-ACK codebook of the HARQ-ACK information for the DCI 622 corresponds to the position in the HARQ-ACK codebook of the HARQ-ACK information corresponding to the assumed SPS PDSCH when assuming that the preset SPS PDSCH is scheduled in slot n. In this regard, the following two methods are possible, and the base station and the terminal will transmit and receive the corresponding DCI in at least one method according to the standard or the base station setting.

Method 1: The base station transmits DCI indicating DL SPS release only in the slot in which the preconfigured SPS PDSCH is to be transmitted.

For example, as in 620 of FIG. 6, if the SPS PDSCH is configured to be transmitted in the slot n, the terminal receives the DCI 622 indicating release of the SPS PDSCH only in the slot n, and the slot in which the HARQ-ACK information is transmitted is the same as the determined slot position, assuming that the SPS PDSCH is transmitted. In other words, when the slot in which the HARQ-ACK information for the SPS PDSCH is transmitted is n+2, the slot in which the HARQ-ACK information for the DCI indicating release of the DL SPS PDSCH is also transmitted is also n+2.

Method 2: The base station transmits DCI indicating DL SPS release in any slot regardless of the slot in which the SPS PDSCH is transmitted.

For example, as in 620 of FIG. 6, when the SPS PDSCH is transmitted in slots n, n+10, n+20, . . . , the base station transmits a DCI 624 indicating release of the corresponding DL SPS PDSCH in slot n+3, and when the value indicated in the PDSCH-to-HARQ_feedback timing indicator included in the corresponding DCI is 1 or the corresponding field is not included but the value preconfigured as a higher signal is 1, HARQ-ACK information 626 for DCI indicating DL SPS PDSCH release is transmitted/received in slot n+4.

Also, there may be a case in which the minimum period of the DL SPS is shorter than 10 ms. For example, if there is data that requires high reliability and low latency wirelessly from different equipment in the factory, and the transmission period of the data is constant and the period itself is short, the transmission period needs to be shorter than the current minimum period of 10 ms. Accordingly, the DL SPS transmission period may be determined in units of slots, symbols, or symbol groups, regardless of subcarrier intervals other than ms. For reference, the minimum transmission period of the uplink configured grant PUSCH resource is 2 symbols.

630 of FIG. 6 shows a situation in which the transmission period of the DL SPS is 7 symbols smaller than the slot. Since the transmission period is within one slot, a maximum of two SPS PDSCHs 632 and 634 may be transmitted in slot k. HARQ-ACK information corresponding to the SPS PDSCH 632 and the SPS PDSCH 634 is transmitted in a slot according to a value set as a higher signal in advance when there is no value or corresponding field indicated by the PDSCH-to-HARQ_feedback timing indicator included in the DCI indicating SPS activation. For example, when the corresponding value is i, the UE transmits HARQ-ACK information 636 for the SPS PDSCH 632 and the SPS PDSCH 634 in slot k+i.

With respect to the location of the HARQ-ACK information in the HARQ-ACK codebook, not only the TDRA, which is the time resource information for which the SPS PDSCH is scheduled, but also the transmission period should be considered. In the past, since only one SPS PDSCH could be transmitted per slot, the location of the HARQ-ACK codebook was determined based on TDRA, which is time resource information, without considering the transmission period, but when the DL SPS transmission period is smaller than the slot, TDRA, which is time resource information, and the transmission period should be considered together to determine the HARQ-ACK codebook position. Here, TDRA is Time Domain Resource Allocation, and includes transmission start symbol and length information of the SPS PDSCH. As an example, when the start symbol of the DL SPS PDSCH determined by the TDRA is 2 and the length is 3, the DL SPS transmission period is 7 symbols, two DL SPS PDSCHs will exist in one slot as 630 of FIG. 6. That is, the first SPS PDSCH 632 is a PDSCH having OFDM symbol indexes 2, 3, and 4 determined in TDRA, and the second SPS PDSCH 634 is a PDSCH having OFDM symbol indexes 9, 10, and 11 in consideration of TDRA and a transmission period of 7 symbols. That is, the second SPS PDSCH in the slot has the same length as the first SPS PDSCH, but the offset is shifted by the transmission period. In summary, for semi-static HARQ-ACK codebook generation or determination, the terminal uses time resource allocation information when the SPS PDSCH transmission period is greater than 1 slot to determine the location of the HARQ-ACK codebook for the SPS PDSCH in one slot, and considers the time resource allocation information and the SPS PDSCH transmission period together when the SPS PDSCH transmission period is less than 1 slot.

When the SPS PDSCH transmission period is less than one slot, the case where the SPS PDSCH spans a slot boundary may occur according to a combination of the transmission period and TDRA. 650 of FIG. 6 shows a corresponding example, and in this case, the base station sets one SPS PDSCH crossing the slot boundary into a PDSCH 652 and a PDSCH 654 for repeated transmission. In this case, the PDSCH 652 and the PDSCH 654 may always have the same length or different lengths. In addition, the UE transmits only one HARQ-ACK information 656 for the SPS PDSCH composed of the PDSCH 652 and the PDSCH 654, and reference slot is based on the slot k+1 in which the last repeatedly transmitted PDSCH 654 is transmitted.

A semi-static HARQ-ACK codebook mapping method for DCI indicating DL SPS release is described below.

When the transmission period of the SPS PDSCH becomes smaller than 1 slot, when the UE transmits HARQ-ACK information for DCI requesting release of the corresponding SPS PDSCH based on the semi-static HARQ-ACK codebook, the terminal maps the HARQ-ACK codebook for the corresponding DCI by at least one of the following methods.

Method 1: The position in the semi-static HARQ-ACK codebook for HARQ-ACK information for DCI indicating the release of the SPS PDSCH is the same as the position in the HARQ-ACK codebook for the first SPS PDSCH from the viewpoint of time resources among the SPS PDSCHs received in one slot.

When the number of SPS PDSCHs in the slot in which the DCI indicating the release of the SPS PDSCH is transmitted is two or more, the terminal maps and transmits the HARQ-ACK information for the corresponding DCI to the position of the semi-static HARQ-ACK codebook for the HARQ-ACK information of the first SPS PDSCH in time.

For example, when the maximum number of transmit/receive PDSCHs without simultaneous PDSCH reception including the SPS PDSCH in the slot in which the DCI indicating release of the SPS PDSCH is to be transmitted is 4, the HARQ-ACK codebook size for the corresponding slot may be 4, and HARQ-ACK information for SPS PDSCH or PDSCH reception will be mapped to each position as {1, 2, 3, 4}. If it is assumed that two SPS PDSCHs exist at positions {2} and {3}, respectively, the HARQ-ACK information indicating release of DL SPS PDSCH is mapped to position {2} among positions in the HARQ-ACK codebook of HARQ-ACK information corresponding to positions {2} and {3}.

Method 2: The position in the semi-static HARQ-ACK codebook for HARQ-ACK information for DCI indicating the release of SPS PDSCH is the same as the location of the HARQ-ACK codebook for the SPS PDSCH that is located last from the viewpoint of time resources among the SPS PDSCHs received in one slot.

If the number of SPS PDSCHs in the slot in which the DCI indicating the release of the SPS PDSCH is transmitted is two or more, the terminal maps and transmit HARQ-ACK information for the corresponding DCI to the position of the semi-static HARQ-ACK codebook for HARQ-ACK information of the last SPS PDSCH in time.

For example, if the maximum number of transmit/receive PDSCHs without simultaneous PDSCH reception including the SPS PDSCH in the slot in which the DCI indicating release of the SPS PDSCH is to be transmitted is 4, the HARQ-ACK codebook size for the corresponding slot may be 4, and HARQ-ACK information for SPS PDSCH or PDSCH reception will be mapped to each position as {1, 2, 3, 4}. If it is assumed that two SPS PDSCHs exist at positions {2} and {3}, respectively, the HARQ-ACK information indicating release of DL SPS PDSCH is mapped to position {3} among positions in the HARQ-ACK codebook of HARQ-ACK information corresponding to positions {2} and {3}.

Method 3: The position in the semi-static HARQ-ACK codebook for HARQ-ACK information for DCI indicating SPS PDSCH release is the same as the positions of all HARQ-ACK codebooks for SPS PDSCHs received in one slot.

When the number of SPS PDSCHs in the slot in which the DCI indicating the release of the SPS PDSCH is transmitted is two or more, the terminal repeatedly maps and transmits HARQ-ACK information for the corresponding DCI to positions in the semi-static HARQ-ACK codebook for HARQ-ACK information of all SPS PDSCHs.

For example, if the maximum number of transmit/receive PDSCHs without simultaneous PDSCH reception including the SPS PDSCH in the slot in which the DCI indicating release of the SPS PDSCH is to be transmitted is 4, the HARQ-ACK codebook size for the corresponding slot may be 4, and HARQ-ACK information for SPS PDSCH or PDSCH reception will be mapped to each position as {1, 2, 3, 4}. If it is assumed that two SPS PDSCHs exist at positions {2} and {3}, respectively, the HARQ-ACK information indicating release of DL SPS PDSCH is repeatedly mapped to positions {2}, {3}. That is, the same HARQ-ACK information is mapped to positions {2} and {3}.

Method 4: The location of the semi-static HARQ-ACK codebook for HARQ-ACK information for DCI indicating SPS PDSCH release is selected based on a higher signal or L1 signal or a combination thereof configured by the base station as one of multiple HARQ-ACK codebook candidate positions for SPS PDSCHs received within one slot.

If the number of SPS PDSCHs in the slot in which the DCI indicating the release of the SPS PDSCH is transmitted is two or more, the base station selects one location with the higher signal, the L1 signal, or a combination thereof among the positions in the semi-static HARQ-ACK codebook for HARQ-ACK information of SPS PDSCHs, and the terminal maps and transmits the HARQ-ACK information for the corresponding DCI at the selected location.

For example, if the maximum number of transmit/receive PDSCHs without simultaneous PDSCH reception including the SPS PDSCH in the slot in which the DCI indicating release of the SPS PDSCH is to be transmitted is 4, the HARQ-ACK codebook size for the corresponding slot may be 4, and HARQ-ACK information for SPS PDSCH or PDSCH reception will be mapped to each position as {1, 2, 3, 4}. If it is assumed that two SPS PDSCHs exist at positions {2} and {3}, respectively, the base station selects {2} by using the DCI indicating release of the DL SPS PDSCH, and the terminal maps HARQ-ACK information instructing the release of the DL SPS PDSCH to position {2} and transmits. As the DCI field for determining the semi-static HARQ-ACK codebook position, a time resource allocation field, a HARQ process number, or a PDSCH-to-HARQ_feedback timing indicator may be used. For example, a time resource allocation field in DCI indicating release of SPS PDSCH indicates time resource information of one SPS PDSCH among SPS PDSCHs that can be transmitted in the corresponding slot, and the terminal may transmit HARQ-ACK information of the corresponding DCI to the semi-static HARQ-ACK codebook position corresponding to the indicated SPS PDSCH.

Method 5: The position in the semi-static HARQ-ACK codebook for HARQ-ACK information for DCI indicating SPS PDSCH release is indicated or configured by the base station by a higher signal or L1 signal or a combination thereof.

When the number of maximum receivable PDSCHs without time overlap in the slot in which the DCI indicating the release of the SPS PDSCH is transmitted is two or more, the base station selects one position as a higher signal or an L1 signal or a combination thereof among the semi-static HARQ-ACK codebook positions for HARQ-ACK information of the corresponding PDSCHs, and the terminal maps and transmits HARQ-ACK information for the corresponding DCI at the selected location.

The set of semi-static HARQ-ACK codebook positions that the base station can select by method 4 is composed of quasi-static HARQ-ACK codebook positions to which HARQ-ACK information of the SPS PDSCH can be mapped, and the set of quasi-static HARQ-ACK codebook positions selectable by the base station by method 5 is composed of semi-static HARQ-ACK codebook positions to which HARQ-ACK information of all PDSCHs can be mapped. For example, when the maximum number of transmit/receive PDSCHs without simultaneous PDSCH reception including the SPS PDSCH in the slot in which the DCI indicating the release of the SPS PDSCH is to be transmitted is 4, if it is assumed that two SPS PDSCHs exist at positions {2} and {3}, respectively, according to method 4, candidate positions where HARQ-ACK for DCI indicating release of SPS PDSCH can be transmitted are {2}, {3}, and according to method 5, candidate positions where HARQ-ACK for DCI indicating release of SPS PDSCH can be transmitted are {1}, {2}, {3}, {4}.

For example, if the maximum number of PDSCHs that can be transmitted and received without simultaneous PDSCH reception including the SPS PDSCH in the slot in which the DCI indicating the release of the SPS PDSCH is to be transmitted is 4, the HARQ-ACK codebook size for the corresponding slot may be 4, and HARQ-ACK information for SPS PDSCH or PDSCH reception will be mapped to each position as {1, 2, 3, 4}. The base station selects {1} by using the DCI indicating release of the DL SPS PDSCH, and the terminal maps and transmits HARQ-ACK information instructing the release of the DL SPS PDSCH to position {1}. As the DCI field for determining the semi-static HARQ-ACK codebook position, a time resource allocation field, a HARQ process number, or a PDSCH-to-HARQ_feedback timing indicator may be used. For example, the time resource allocation field in the DCI indicating the release of the SPS PDSCH indicates time resource information of one PDSCH among PDSCHs that can be transmitted in the corresponding slot, and the terminal transmits HARQ-ACK information of the corresponding DCI to the semi-static HARQ-ACK codebook position corresponding to the indicated PDSCH.

The above-described methods may be possible in a situation in which only one HARQ-ACK transmission is supported in one slot. When code block group (CBG)-based transmission is configured as higher signaling through DL SPS PDSCH, the terminal may repeat HARQ-ACK information for DCI indicating DL SPS PDSCH release by the number of CBGs to map and transmit to the semi-static HARQ-ACK codebook resource determined by at least one of the above methods.

Although the above-described methods have been described as methods for transmitting HARQ-ACK information for DL SPS PDSCH indicating release of one SPS PDSCH transmission/reception, the methods may also be applied to the method of transmitting HARQ-ACK information for a DL SPS PDSCH indicating simultaneous release of two or more activated PDSCH transmission/reception in one cell or/and one BWP. As an example, when DCI indicating release of one DL SPS PDSCH is related to a plurality of SPS PDSCHs activated in one cell or/and one BWP, the SPS PDSCHs considered for HARQ-ACK codebook positioning may belong to one SPS configuration or may be SPS PDSCHs belonging to all configurations. At this time, when the SPS PDSCHs considered in the one SPS configuration belong to the one SPS configuration, the one SPS configuration may be an SPS configuration having the lowest SPS PDSCH configuration number (or an SPS index, an SPS configuration identifier) or an SPS configuration activated first. This is only an example, and other similar methods may be sufficiently possible.

Hereinafter, a dynamic HARQ-ACK codebook mapping method for multiple SPS PDSCHs transmitted in one slot will be described.

In the dynamic HARQ-ACK codebook (or Type 2 HARQ-ACK codebook), the location of corresponding HARQ-ACK information is basically determined by Total DAI and Counter DAI included in DCI for scheduling PDSCH. Total DAI informs the size of the HARQ-ACK codebook transmitted in slot n, and Counter DAI informs the location of the HARQ-ACK codebook transmitted in slot n. Next, the dynamic HARQ-ACK codebook in Rel-15 NR is configured by [pseudo-code 3].

[Start pseudo-code 3]
If the UE transmits HARQ-ACK information in a PUCCH in slot n and for any PUCCH format, the UE determines the $\tilde{o}_o^{ACK}, \tilde{o}_1^{ACK}, \ldots \tilde{o}_{O_{ACK}-1}^{ACK}$, for a total number of $O_{ACK}$ HARQ-ACK information bits, according to the following pseudo-code:

Set m = 0 - PDCCH with DCI format 1 0 or DCI format 1_0 or DCI 1_1 monitoring occasion index: lower index corresponds to earlier PDCCH with DCI format 1_0 or DCI format 1_1 monitoring occasion
    Set j = 0
    Set $V_{temp} = 0$
    Set $V_{temp2} = 0$
    Set $V_S = \emptyset$
    Set $N_{cells}^{DL}$ to the number of serving cells configured by higher layers for the UE
    Set M to the number of PDCCH monitoring occasion(s)
        while m < M
            Set c = 0 - serving cell index: lower indexes correspond to lower RRC indexes of corresponding cell
                while c < $N_{cells}^{DL}$
            if PDCCH monitoring occasion m is before an active DL BWP change on serving cell c or an active UL BWP change on the PCell and an active DL BWP change is not triggered by a DCI format 1_1 in PDCCH monitoring occasion m
                c = c + 1;
            else
                if there is a PDSCH on serving cell c associated with PDCCH in PDCCH monitoring occasion m, or there is a PDCCH indicating SPS PDSCH release on serving cell c
                    if $V_{C-DAI,c,m}^{DL} \leq V_{temp}$
                        j = j + 1
                    end if
                  $V_{temp} = V_{C-DAI,c,m}^{DL}$
                  if $V_{T-DAI,m}^{DL} = \emptyset$
                      $V_{temp2} = V_{C-DAI,c,m}^{DL}$
                  else
                      $V_{temp2} = V_{T-DAI,m}^{DL}$
                  end if
                  if harq-ACK-SpatialBundlingPUCCH is not provided and m is a monitoring occasion for PDCCH with DCI format 1_0 or DCI format 1_1 and the UE is configured by maxNrofCodeWordsScheduledByDCI with reception of two transport blocks for at least one configured DL BWP of at least one serving cell, $$\tilde{o}_{8j+2(V_{C-DAI,c,m}^{DL}-1)}^{ACK} = HARQ\text{-}ACK$$

information bit corresponding to the first transport block of this cell $$\tilde{o}_{8j+2(V_{C-DAI,c,m}^{DL}-1)}^{ACK} = HARQ\text{-}ACK$$

information bit corresponding to the second transport block of this cell
                  $V_s = V_s \cup \{8j + 2(V_{C-DAI,c,m}^{DL} - 1), 8j +2(V_{C-DAI,c,m}^{DL} - 1) + 1\}$
                  elseif harq-ACK-SpatialBundlingPUCCH is provided to the UE and m is a monitoring occasion for PDCCH with DCI format 1 1 and the UE is configured by maxNrofCode WordsScheduledByDCI with reception of two transport blocks in at least one configured DL BWP of a serving cell, $$\tilde{o}_{4j+V_{C-DAI,c,m}^{DL}-1}^{DL} = \text{binary AND operation of}$$

the HARQ-ACK information bits corresponding to the first and second transport blocks of this cell
                  $V_s = V_s \cup \{4j + V_{C-DAI,c,m}^{DL} - 1\}$
                  else $$\tilde{o}_{4j+V_{C-DAI,c,m}^{DL}-1}^{ACK} = HARQ\text{-}ACK$$

information bit of this cell
                  $V_s = V_s \cup \{4j + V_{C-DAI,c,m}^{DL} - 1\}$
                end if
              end if
              c = c + 1
            end if
            end while
        m = m + 1
    end while

```
    if V_temp2 < V_temp
        j = j + 1
    end if
    if harq-ACK-SpatialBundlingPUCCH is not provided to the UE
and the UE is configured by maxNrofCodeWordsScheduledByDCI with reception of
two transport blocks for at least one configured DL BWP of a serving cell,
        O^ACK = 2 · (4 · j + V_temp2)
    else
        O^ACK = 4 · j + V_temp2
    end if
    õ_i^ACK = NACK for any i ∈ {0, 1, . . ., O^ACK − 1}\V,
    Set c = 0
    while c < N_cells^DL
        if SPS PDSCH reception is activated for a UE
and the UE is configured to receive SPS PDSCH in a slot n − K_{1,c} for serving cell c,
where K_{1,c} is the PDSCH-to-HARQ-feedback timing value for SPS PDSCH on
serving cell c
            O^ACK = O^ACK + 1
            o_{O^ACK−1}^ACK = HARQ-ACK information bit associated with
the SPS PDSCH reception
        end if
        c = c + 1;
    end while
[End pseudo-code 3]
```

[pseudo-code 3] is applied when the transmission period of the SPS PDSCH is greater than 1 slot, and when the transmission period of the SPS PDSCH is less than 1 slot, the dynamic HARQ-ACK codebook will be determined by the following [pseudo-code 4]. Alternatively, [pseudo-code 4] may be generally applied regardless of the SPS PDSCH transmission period or the number of SPS PDSCHs activated in one cell or/and one BWP (or one cell/one BWP).

[Start Pseudo-Code 4]

If the UE transmits HARQ-ACK information in a PUCCH in slot n and for any PUCCH format, the UE determines the $\tilde{O}_0^{ACK}, \tilde{O}_1^{ACK}, \ldots, \tilde{O}_{O^{ACK}-1}^{ACK}$, for a total number of $O_{ACK}$ HARQ-ACK information bits, according to the following pseudo-code:

Set m=0-PDCCH with DCI format 1_0 or DCI format 1_1 monitoring occasion index: lower index corresponds to earlier PDCCH with DCI format 1_0 or DCI format 1_1 monitoring occasion Set j=0

Set $V_{temp}$=0

Set $V_{temp2}$=0

Set $V_s$==∅

Set $N_{cells}^{DL}$ to the number of serving cells configured by higher layers for the UE Set M to the number of PDCCH monitoring occasion(s)

while m<M

Set c=0—serving cell index: lower indexes correspond to lower RRC indexes of corresponding cell while c<$N_{cells}^{DL}$ if PDCCH monitoring occasion m is before an active DL BWP change on serving cell c or an active UL BWP change on the PCell and an active DL BWP change is not triggered by a DCI format 1_1 in PDCCH monitoring occasion m c=c+1;

else if there is a PDSCH on serving cell c associated with PDCCH in PDCCH monitoring occasion m, or there is a PDCCH indicating SPS PDSCH release on serving cell c if $V_{C-DAI,c,m}^{DL} \leq V_{temp}$ j=j+1 end if $V_{temp} = V_{C-DAI,c,m}^{DL}$ if $V_{T-DAI,m}^{DL} = \emptyset$ $V_{temp2} = V_{C-DAI,c,m}^{DL}$ else $V_{temp2} = V_{T-DAI,m}^{DL}$ end if if harq-ACK-SpatialBundlingPUCCH is not provided and m is a monitoring occasion for PDCCH with DCI format 1_0 or DCI format 1_1 and the UE is configured by maxNrofCodeWordsScheduledByDCI with reception of two transport blocks for at least one configured DL BWP of at least one serving cell, $$\tilde{o}_{8j+2(V_{C-DAI,c,m}^{DL}-1)}^{ACK} = HARQ\text{-}ACK$$

information bit corresponding to the first transport block of this cell $$\tilde{o}_{8j+2(V_{C-DAI,c,m}^{DL}-1)+1}^{ACK} = HARQ\text{-}ACK$$

information bit corresponding to the second transport block of this cell $V_s = \cup \{8j+2(V_{C-DAI,c,m}^{DL}-1), 8j+2(V_{C-DAI,c,m}^{DL}-1)+1\}$ elseif harq-ACK-SpatialBundlingPUCCH is provided to the UE and m is a monitoring occasion for PDCCH with DCI format 1_1 and the UE is configured by maxNrofCodeWordsScheduledByDCI with reception of two transport blocks in at least one configured DL BWP of a serving cell, $$\tilde{o}_{4j+V_{C-DAI,m}^{DL}-1}^{ACK} = binary$$

AND operation of the HARQ-ACK information bits corresponding to the first and second transport blocks of this cell $$V_s = V_s \cup \{4j + V_{C-DAI,c,m}^{DL} - 1\}$$

else $$\tilde{O}_{4j+V_{C-DAI,c,m}^{DL}}^{ACK} - 1 = \text{HARQ-ACK information bit of this cell}$$

$$V_s = V_s \cup \{4j + V_{C-DAI,c,m}^{DL} - 1\}$$

end if
end if
c=c+1
end if
end while
m=m+1
end while
if $V_{temp2} < V_{temp}$
j=j+1
end if
if harq-ACK-SpatialBundlingPUCCH is not provided to the UE and the UE is configured by maxNrofCodeWordsScheduledByDCI with reception of two transport blocks for at least one configured DL BWP of a serving cell, $$O^{ACK} = 2 \cdot (4 \cdot j + V_{temp2})$$

else $$O^{ACK} = 4 \cdot j + V_{temp2}$$

end if
$\tilde{O}_i^{ACK}$=NACK for any i ∈ {0,1 ..., $O^{ACK}$−1}\\$V_s$
Set c=0
while c<$N_{cells}^{DL}$
if SPS PDSCH reception is activated for a UE and the UE is configured to receive multiple SPS PDSCHs in a slot n=$K_{1,c}$ for serving cell c, where $K_{1,c}$ is the PDSCH-to-HARQ-feedback timing value for SPS PDSCH on serving cell c
$O^{ACK} = O^{ACK} + K$ where k is the number of multiple SPS PDSCHs in a slot n−$K_{1,c}$
$O_{O^{ACK}-1}^{ACK}$=HARQ-ACK information bit associated with the SPS PDSCH reception
end if
c=c+1;
end while
$O^{ACK} + O^{ACK}$+k where k is the number of multiple SPS PDSCHs in a slot n−$K_{1,c}$ $$o_{O^{ACK}-1}^{ACK} = HARQ\text{-}ACK$$

information bit associated with the SPS PDSCH reception
end if
c=c+1:
end while
[End Pseudo-Code 4]

In the above-mentioned [pseudo-code 4], the value k, which is the number of SPS PDSCHs in one slot, corresponds to only one SPS PDSCH configuration in one cell/one BWP or may include all SPS PDSCH configurations when multiple SPS PDSCH configurations are possible in one cell or/and one BWP.

The [pseudo-code 3] or [pseudo-code 4] may be applied in a situation where HARQ-ACK information transmission is limited to at most one per slot.

Hereinafter, an individual HARQ-ACK transmission method for multiple SPS PDSCHs transmitted in one slot will be described.

When the UE receives a DL SPS transmission period smaller than 1 slot and a higher signal configured to perform only one HARQ-ACK transmission per slot, the terminal transmits HARQ-ACK information for the DL SPS PDSCH 632 and the DL SPS PDSCH 634 received in the slot k to the PUCCH of the slot k+i indicated in advance by a higher signal or an L1 signal or a combination thereof, as in 630 of FIG. 6. As an example, the UE determines the granularity of the PDSCH-toHARQ_feedback timing indicator in the DCI format indicating DL SPS activation at the slot level, and the base station provides the terminal with a difference value between the slot index in which the DL SPS PDSCH is received and the slot index in which the HARQ-ACK information is transmitted, and configures the PUCCH resource through which HARQ-ACK information is transmitted in the slot indicated by L1 to the terminal as a higher signal. 630 of FIG. 6 shows a situation in which the PDSCH-to-HARQ_feedback timing indicator indicates the value of i. The corresponding value may be directly selected as the L1 signal, or candidate values may be set as a higher signal, and it may be possible to select one of these values as the L1 signal.

When a terminal or a base station wants to separately transmit and receive HARQ-ACK information for DL SPS PDSCHs that are individually transmitted/received, the base station may configure a DL SPS transmission period smaller than one slot and two or more HARQ-ACK transmissions per slot as higher signals. For example, as in 660 of FIG. 6, the terminal may transmit HARQ-ACK information for the SPS PDSCH 662 received in slot k through the PUCCH 666 in slot k+i, and may transmit HARQ-ACK information for the SPS PDSCH 664 through the PUCCH 668 in slot k+i. To enable this, as an example, the UE determines the granularity for the PDSCH-to-HARQ_feedback timing indicator in the DCI format indicating DL SPS activation at the symbol level, and the corresponding value may mean the total symbol length from the transmission end symbol (or transmission start symbol) of the SPS PDSCH to the transmission start symbol (or transmission end symbol) of the PUCCH in which the corresponding HARQ-ACK information is transmitted.

In 660 of FIG. 6, when the end symbol of the SPS PDSCH 662 is s0, and the start symbol of the PUCCH 666 through which HARQ-ACK information for the SPS PDSCH 662 is transmitted is s1, the value indicated by the PDSCH to HARQ-ACK timing indicator will be "s1-s0", this value may be directly selected by the L1 signal, or candidate values may be configured as a higher signal and one of these values may be determined as the L1 signal. Through the information, the UE can determine the start symbol of the PUCCH to which the HARQ-ACK information for the SPS PDSCH will be transmitted.

Other PUCCH transmission information may be determined as a higher signal, an L1 signal, or a combination thereof. If the PUCCH resource indicator in the L1 or higher signal of Rel-15 is used, the terminal may determine that the "starting symbol index" field among the values indicated by the corresponding indicator is not used. Alternatively, since the starting symbol in which the HARQ-ACK information is transmitted separately has already been provided through the PDSCH-to-HARQ feedback timing indicator information, a new higher signal without a corresponding field or a signal composed of an L1 signal or a combination thereof may be provided to the UE. In summary, the UE may differently interpret the PDSCH-to-HARQ feedback timing indicator field included in the DCI indicating activation of the SPS PDSCH according to the SPS PDSCH transmission period as follows.

Method-1: Determine by slot level
For example, when the transmission period of the SPS PDSCH is greater than 1 slot, the UE determines the granularity of the PDSCHtoHARQ_feedback timing indicator as the slot level.

Method 2: Determine by symbol level
For example, when the transmission period of the SPS PDSCH is less than 1 slot, the UE determines the granularity of the PDSCH to HARQ-ACK timing feedback indicator as a symbol level.

Hereinafter, a method of changing the DL SPS or configured grant (CG) period for aperiodic traffic will be described.

The transmission period of the DL SPS supported by the base station may be a unit of a slot level or a symbol level. If information sensitive to the delay time of the equipment operated in the factory is periodically generated and the period is not a value or a multiple of the standard supported by the 3GPP standard organization, the base station may not be able to configure an effective DL SPS transmission period. For example, if there is a traffic pattern having a 2.5 symbol interval, the base station may not be able to allocate only a DL SPS having a transmission period of 2 symbols or 3 symbols.

Accordingly, there is a need to introduce a signal for setting a DL SPS transmission period having aperiodicity or dynamically changing the transmission period. It is possible for the terminal to dynamically change the transmission period by at least one of the following methods.

Method 1: DL SPS transmission period allocation method with aperiodicity

The base station may be able to set the DL SPS transmission period in a bitmap manner. For example, when bitmap information composed of 10 bits exists as a higher signal, 1 is DL SPS transmission and 0 is DL SPS non-transmission, in a case that a bit unit means a slot unit, it may be possible to make a DL SPS transmission period of various patterns even if it is not a period for 10 slots. In addition, the pattern may be repeated in units of 10 slots. Alternatively, a bitmap size and a section indicated by a corresponding bit may be a slot, a symbol, or a symbol group. The corresponding information may be independently configured as a higher signal, or it may be possible to vary the range of the transmission period that each bit can indicate according to the size of the bitmap. For example, when the size of the bitmap is 20, the time range indicated by each bit is in units of 7 symbols, and when the size of the bitmap is 10, the time range indicated by each bit is in units of slots.

Alternatively, it will be possible for the base station to configure two or more DL SPS transmission periods with a higher signal in advance, and to configure a time difference for each consecutively transmitted DL SPS as a pattern. For example, it may be possible to determine a DL SPS transmission period having a 2-symbol interval and a 3-symbol interval for a 2.5-symbol traffic pattern. The following Table 8 is a table regarding the setting of the aperiodic DL SPS transmission period. Z is a prime number having a value of (up to) the first decimal unit, and has a relationship of X<Z<X+1. For example, when Z is 3.2, X has a value of 3. Gap 1 means a symbol interval between the first SPS PDSCH resource received by the UE and the second SPS PDSCH resource thereafter after receiving the DCI indicating SPS activation. Gap 2 means a symbol interval between the second SPS PDSCH resource and the third SPS PDSCH resource thereafter. That is, Gap i means a symbol interval between the $i^{th}$ SPS PDSCH resource and the $(i+1)^{th}$ SPS PDSCH resource thereafter. Configuration is a parameter for selecting one of various patterns, and in Table 8, a configuration with a total of 9 patterns is described. The corresponding parameter is provided to the UE by a higher signal or an L1 signal, and the UE may determine the DL SPS PDSCH transmission period pattern by the value indicated by the corresponding parameter. As another example, it may be possible that a value of one of the configurations is implicitly determined according to a value of a traffic generation period. For example, if the base station and the terminal transmit/receive the corresponding information according to the 2.3 symbol traffic pattern by higher signal configuration, the base station and the terminal may determine that configuration 3 is applied.

TABLE 8

| Configuration | 1 | 2 | 3 | 4 | 5 | 6 | 7 | 8 | 9 |
|---|---|---|---|---|---|---|---|---|---|
| Gap 1 | X+1 | X+1 | X+1 | X+1 | X+1 | X+1 | X+1 | X+1 | X+1 |
| Gap 2 | X | X | X | X | X | X+1 | X+1 | X+1 | X+1 |
| Gap 3 | X | X | X | X+1 | X+1 | X | X+1 | X+1 | X+1 |
| Gap 4 | X | X | X+1 | X | X | X+1 | X | X+1 | X+1 |
| Gap 5 | X | X | X | X | X+1 | X | X+1 | X | X+1 |
| Gap 6 | X | X+1 | X | X+1 | X | X+1 | X+1 | X+1 | X+1 |
| Gap 7 | X | X | X+1 | X | X+1 | X+1 | X | X+1 | X+1 |
| Gap 8 | X | X | X | X+1 | X | X | X+1 | X+1 | X+1 |
| Gap 9 | X | X | X | X | X+1 | X+1 | X+1 | X+1 | X+1 |
| Gap 10 | X | X | X | X | X | X | X | X | X |

Method 2: Method to change the DL SPS transmission period dynamically

Method 2-1: Include transmission period information in DCI indicating DL SPS activation.

A DL SPS transmission period value may be included in information of the DCI. A set of transmission period candidate values is previously configured as a higher signal, and a specific value in the set may be indicated as information included in DCI. For example, when the transmission period is configured to {1 slot, 2 slots} with the higher signal, 1 bit of the corresponding transmission period field is included in the DCI, and the 1 bit indicates whether the transmission period is 1 slot or 2 slots. That is, the number of DCI bits is determined according to the set of transmission periods configured as the higher signal, and when the number of sets is N, a total of ceil ($\log_2(N)$) bits are included in the DCI. The corresponding DCI corresponds to a non-fallback DCI such as DCI format 1_1, and in the case of a fallback DCI such as DCI format 1_0, even if the corresponding field does not exist or is present, a fixed bit value or/and periodic values associated with each corresponding bit value may be applied. For example, in the case of fallback DCI, the field indicating the transmission period may have a fixed number of bits with n bits, or/and the value of the transmission period indicated by each value of the field may be fixed.

Method 2-2: Utilization of existing field in DCI format indicating activation of DL SPS 1.

When one field in the DCI format indicating DL SPS activation indicates a specific value, the value of the other field may be used to indicate a transmission period rather than the previously indicated value. For example, when all bit values of the field indicating the HARQ process number in the DCI indicating DL SPS activation indicate a value of "1", the field informing of time resource information may be used to inform of one DL SPS transmission period among a set of DL SPS transmission periods previously configured as a higher signal.

Method 2-3: Use of existing field in DCI format indicating activation of DL SPS 2

In the case of a DCI format indicating DL SPS activation, it may be possible that a specific field in the corresponding DCI format itself always indicates the transmission period, or that a specific value among specific fields in the corresponding DCI format indicates the transmission period. For example, when the received DCI is verified in a format indicating activation of the SPS PDSCH, when the value of the time resource allocation field included in the DCI is a specific value, the terminal determines that the value of the time resource allocation field is used as a value indicating the transmission period of the SPS PDSCH rather than a value indicating the start symbol and length of the existing SPS PDSCH. The mapping relationship between the specific value of the time resource allocation field and the SPS PDSCH transmission period may be configured by higher signaling or may be predetermined.

Method 2-4: Search space-based implicit transmission period information configuration.

A transmission period value is dynamically changed according to a search space in which DCI indicating DL SPS activation is transmitted. For example, the DCI indicating DL SPS activation transmitted to the common search space indicates the SPS PDSCH transmission period A value, and the DCI indicating the activation of the DL SPS transmitted to the UE specific search space indicates the transmission period B value, which the UE may implicitly determine. The transmission period A and the transmission period B associated with the search space may be previously set by the terminal as a higher signal.

Method 2-5: Implicit transmission period information configuration based on DCI format.

The transmission period value is dynamically changed according to the DCI format indicating DL SPS activation. For example, DCI indicating activation of DL SPS transmitted in DCI format 1_0, which is a fallback DCI, indicates an SPS PDSCH transmission period A value, and the DCI indicating activation of the DL SPS transmitted in DCI format 1_1, which is a non-fallback DCI, indicates the value of the SPS PDSCH transmission period B, which the UE may implicitly determine. The transmission period A and the transmission period B may be previously configured by the terminal as a higher signal.

In the disclosure, when the transmission period of the SPS is within 1 slot, the UE does not expect to configure or receive DL SPS PDSCH time resource information having a length exceeding the transmission period of the DL SPS, and when the corresponding setting or instruction is given, the terminal regards it as an error and ignores it. For example, when the transmission period of the DL SPS is 7 symbols, the UE must have the time resource length information of the DL SPS PDSCH within 7 symbols.

Figure 7:
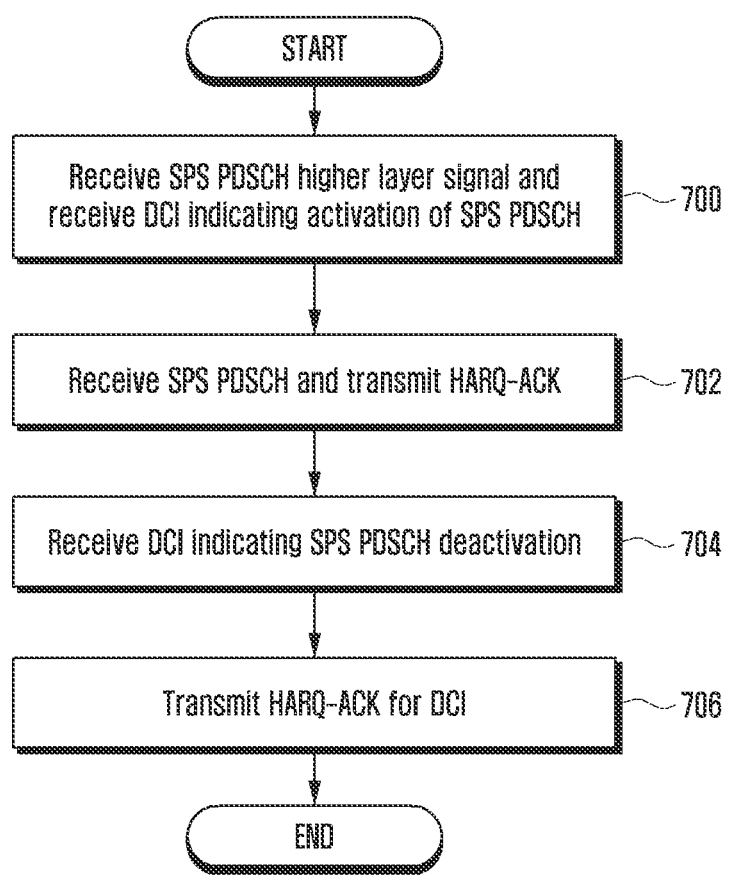
FIG. 7 is a block diagram illustrating a process in which a terminal transmits semi-static HARQ-ACK codebook-based HARQ-ACK information for downlink control information (DCI) indicating deactivation of SPS physical downlink shared channel (PDSCH) according to an embodiment of the disclosure.

FIG. 7 is a block diagram illustrating a process in which a terminal transmits semi-static HARQ-ACK codebook-based HARQ-ACK information for DCI indicating deactivation of SPS PDSCH according to an embodiment of the disclosure.

Referring to FIG. 7, the UE receives the SPS PDSCH configuration information as a higher signal. In this case, the information set as the higher signal may include a transmission period, an MCS table, HARQ-ACK configuration information, and the like. After receiving the higher signal, the terminal receives at operation 700 DCI for activating the SPS PDSCH from the base station. After receiving the DCI indicating the activation, the UE periodically receives the SPS PDSCH and transmits HARQ-ACK information corresponding thereto at operation 702. Thereafter, when there is no more downlink data to be transmitted/received periodically, the base station transmits a DCI indicating SPS PDSCH deactivation to the terminal, and the terminal receives at operation 704 the same.

The UE transmits at operation 706 HARQ-ACK information for DCI indicating deactivation of the SPS PDSCH according to the SPS PDSCH transmission period. For example, when the transmission period is greater than 1 slot, the UE transmits the HARQ-ACK information for DCI indicating deactivation of the SPS PDSCH in the location of the HARQ-ACK codebook for HARQ-ACK information corresponding to the SPS PDSCH. HARQ-ACK information transmission may be possible by at least one of the above-described method 1 or method 2. When the transmission period is less than 1 slot, the UE may transmit HARQ-ACK information for DCI information indicating SPS PDSCH deactivation by at least one of the methods 1 to 5 described above.

The descriptions described above referring to FIG. 7 are operations applied when the terminal is previously configured to use the semi-static HARQ-ACK codebook from the base station as a higher signal. In addition, the descriptions described above referring to FIG. 7 may be limited to a case in which the terminal is configured in advance to enable only one HARQ-ACK transmission per slot by a higher signal or standard or terminal capability.

Figure 8:
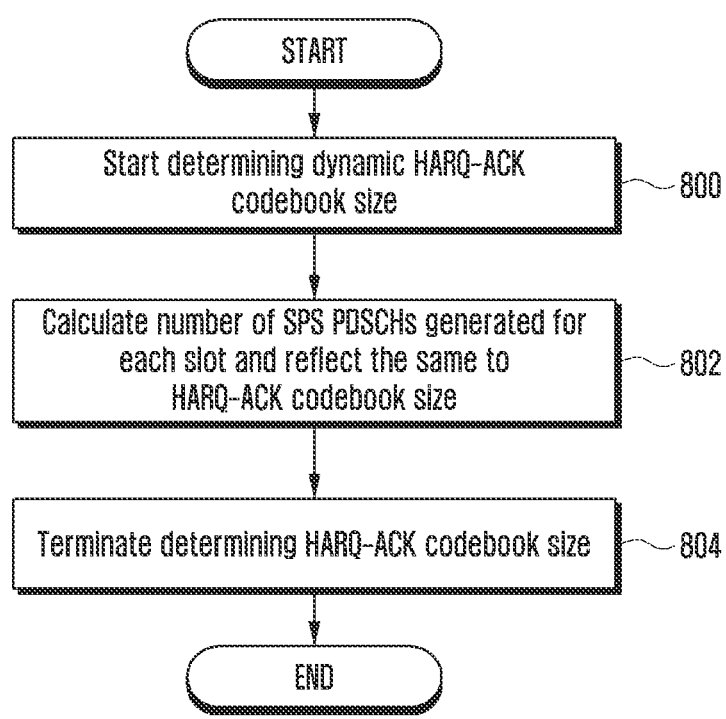
FIG. 8 is a block diagram illustrating a method for a terminal to determine a dynamic HARQ-ACK codebook for SPS PDSCH reception according to an embodiment of the disclosure.

FIG. 8 is a block diagram illustrating a method for a terminal to determine a dynamic HARQ-ACK codebook for SPS PDSCH reception according to an embodiment of the disclosure.

Referring to FIG. 8, when the UE is previously configured to operate with the dynamic HARQ-ACK codebook as a higher signal, the UE starts determining the size of the HARQ-ACK codebook for HARQ-ACK information to be transmitted in a specific slot at operation 800. The UE not only determines the HARQ-ACK codebook size for the dynamically scheduled PDSCH, but also calculates the total number of SPS PDSCHs generated in the slot corresponding to the slot in which the HARQ-ACK information is to be transmitted, and reflects the same to the HARQ-ACK codebook size at operation 802. The UE may be able to set the dynamic HARQ-ACK codebook by at least one of [pseudo-code 3] or [pseudo-code 4] described above with respect to FIG. 6. Thereafter, the UE terminates determining the size of the HARQ-ACK codebook at operation 804, and transmits HARQ-ACK information in the corresponding slot.

In addition, the descriptions described above referring to FIG. 8 may be limited to a case in which the terminal is configured in advance to enable only one HARQ-ACK transmission per slot with a higher signal or standard or terminal capability. For reference, when one SPS PDSCH is repeatedly transmitted across a slot boundary as in 650 of FIG. 6, the UE determines the HARQ-ACK codebook size based on the last repeated transmission slot of the SPS PDSCH when determining the dynamic HARQ-ACK codebook. Specifically, in the case of slot k in 650 of FIG. 6, although the SPS PDSCH 652 was transmitted in slot k, instead of calculating 652 as the number of valid SPS PDSCHs to determine the dynamic HARQ-ACK codebook size, the UE considers the SPS PDSCH 654 transmitted in slot k+1. Determines the dynamic HARQ-ACK codebook size. In addition, when determining the value of the number of SPS PDSCHs per slot (k) for dynamic HARQ-ACK codebook size determination in a specific slot in [pseudo-code 4], the number of valid SPS PDSCHs is calculated based on the slot (or end slot) to which the end symbol of the last SPS PDSCH among the repeatedly transmitted SPS PDSCHs belongs.

Periodic data transmission/reception refers to an operation of transmitting and receiving data at regular intervals as described above. The period may have a slot unit, a symbol unit, a frame unit, or a subframe unit, and the value of the period usually has a value of a natural number, but may have a rational value according to a specific situation. The case of having a period of a natural value means having a period such as 2 symbols, 1 slot, 10 ms, and the like. Having a period of a rational value specifically means a positive rational value, and means having a period such as 2.1 symbols or 1.4 slots or 10.3 ms. An example of a situation in which a period having a positive integer value is required may correspond to a data transmission/reception period for media information such as 60 fps (frames per second) or 120 fps. 60 fps means that 60 frames per second are periodically transmitted and received, when converted to ms, it is 16.66666 . . . ms as a rational number, and it has a value of 16.67 ms when rounded to the third place after the decimal point. 120 fps means that 120 frames per second are periodically transmitted and received, when converted to ms, it is 8.3333 . . . ms as a rational number, and it has a value of 8.33 ms when rounded to the third place after the decimal point. Therefore, if the 60 fps or 120 fps is based on the frame structure defined in 5G NR, the period shown in Table 9 will be required.

TABLE 9

| SCS | 1 slot (ms) | 1 symbol (ms) | 1000/60/1 symbol | 1000/120/1 symbol |
|-----|-------------|---------------|------------------|-------------------|
| 15  | 1           | 0.071428571   | 233.33           | 116.67            |
| 30  | 0.5         | 0.035714286   | 6533.33          | 3266.67           |
| 60  | 0.25        | 0.017857143   | 365866.67        | 182933.33         |
| 120 | 0.125       | 0.008928571   | 40977066 . . .   | 20488533 . . .    |
| 240 | 0.0625      | 0.004464286   | 9.18E+09 . . .   | 4.59E+09 . . .    |

In Table 9, in the case of 120 kilohertz (kHz) and 240 kHz, since the values are large, the decimal places are not accurately indicated, but a period with a decimal value is required from a symbol unit point of view. However, since introducing a new symbol or slot structure to support the corresponding 60 fps or 120 fps traffic cycle may change the existing structure of 5G NR or affect other functions, other methods based on the existing 5G NR architecture may be required. In the following description, methods for this will be described in detail. Also, in the following description, the DL SPS will be mainly described, but it may be equally applicable to the UL CG.

Figure 9:
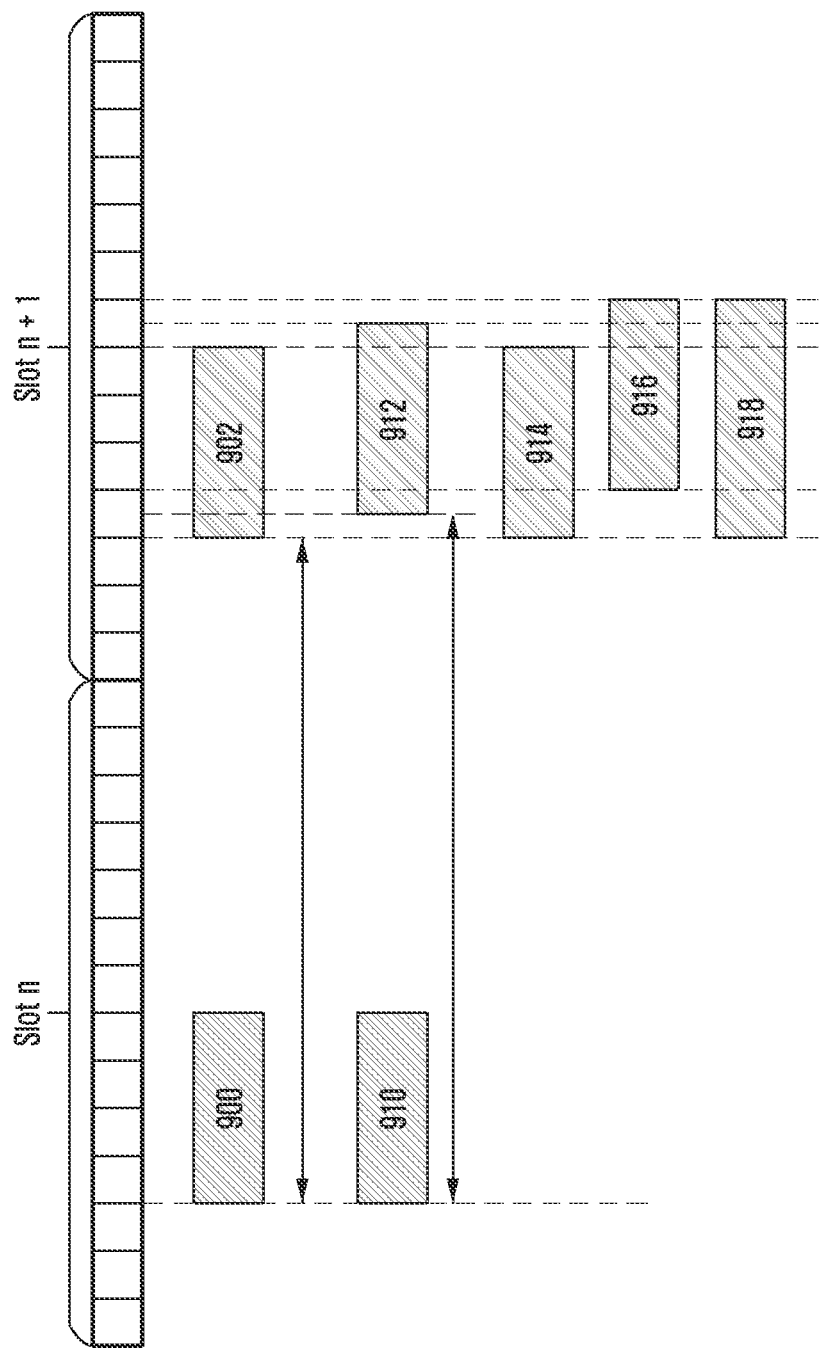
FIG. 9 is a diagram illustrating a method for transmitting and receiving periodic data according to an embodiment of the disclosure.

FIG. 9 is a diagram illustrating a method for transmitting and receiving periodic data according to an embodiment of the disclosure.

Referring to FIG. 9, 900 received in slot n and 902 received in slot n+1 are SPS PDSCH resources that are periodically transmitted and received according to the same SPS configuration, and the transmission period of the SPS PDSCH is one slot. Therefore, for each slot, the UE will receive SPS PDSCHs starting from the fourth symbol and having a length of 4 symbols. That is, the UE will receive SPS PDSCHs having the same start symbol and symbol length for each slot. Alternatively, in FIG. 9, it is assumed that 910 received in slot n and 912 to be received in slot n+1 are SPS PDSCH resources that are periodically transmitted and received according to the same SPS configuration, and the transmission/reception period of the two SPS PDSCHs 910 and 912 is 14.5 symbols. In the first SPS PDSCH 910, the SPS PDSCH is allocated from the fourth symbol in the slot n, while the second SPS PDSCH 912 is allocated the SPS PDSCH from the $4.5^{th}$ symbol in the slot n+1.

Since the terminal and the base station basically transmit and receive data or control information in symbol units for all subcarrier intervals, in FIG. 9, as in SPS PDSCH 912, in a state in which data is allocated from the $4.5^{th}$ symbol, the base station and the terminal cannot perform data transmission/reception. Therefore, although the transmission/reception period is 14.5 symbols, the SPS PDSCH needs to be aligned with the data resource symbol unit to which the SPS PDSCH is allocated.

There may be various methods for this, and one of them may be a method of transmitting and receiving data by forwarding 0.5 symbols like SPS PDSCH 914. This is referred to as method 1. Alternatively, a method of transmitting and receiving data with a delay of 0.5 symbols like SPS PDSCH 916 may be possible. This is referred to as method 2. In both of the above methods, the start symbol length is different, and the data transmission length is the same. Alternatively, as in SPS PDSCH 918, data transmission and reception start time is advanced by 0.5 symbol like SPS PDSCH 914, and data transmission/reception end time is delayed by 0.5 symbol like SPS PDSCH 916. At this time, the data transmission length is actually increased by 1 symbol. This is referred to as method 3.

A form in which the above three methods are combined may also be possible. For example, rounding is based on the data transmission/reception time. Specifically, when the SPS PDSCH is set to start from the middle of the $X^{th}$ symbol, the value of X is rounded up to a natural number. When data transmission and reception starts from the $X.2^{th}$ symbol, it can be determined that the value of 0 rounded off by 0.2 is configured to transmit and receive the SPS PDSCH from the $X^{th}$ symbol as in method 1. Alternatively, when data transmission and reception starts from the $X.7^{th}$ symbol, it may be determined that the value of 1 rounded off by 0.7, that is, set to transmit and receive the SPS PDSCH from the $(X+1)^{th}$ symbol as in method 2.

Alternatively, it may be possible to indicate that one of the methods 1 to 3 is used by a higher layer signal or an L1 signal or a combination thereof. Alternatively, it may be possible to be determined by one of methods 1 to 3 according to whether a symbol starting from the SPS PDSCH 912 is a DL symbol, a UL symbol, or a flexible symbol. For example, in the case of a DL symbol, method 1 may be applied, and in the case of a UL symbol, method 2 may be applied.

Alternatively, it may be possible to determine to use a specific method by additionally considering a TA value in addition to the symbol value starting from the SPS PDSCH 912. For example, it may be possible to apply not only the transmission period of the SPS PDSCH but also the absolute value of the TA value indicated to the base station or the accumulated value for a certain period to the starting point of the SPS PDSCH 912 when determining the starting point of the SPS PDSCH 912 in FIG. 9. When the value is negative, the SPS PDSCH 912 may start before the start position shown in FIG. 9, and when the value is positive, the SPS PDSCH 912 may start after the start position shown in FIG. 9. If this is expressed as an equation, when the start time of the SPS PDSCH 912 is x and the TA cumulative value or the absolute value is a, it may be possible for the UE to determine the starting point of the SPS PDSCH 912 applied in consideration of the actual TA value as x+a. When there is an SPS PDSCH having a period with a positive integer value in FIG. 9, since the period value is fixed, the base station and the terminal can determine in advance which method the SPS PDSCH starts and what the corresponding length is among methods 1 to 3. In addition, the period having the positive integer value may be indicated in advance through a higher signal.

Figure 10:
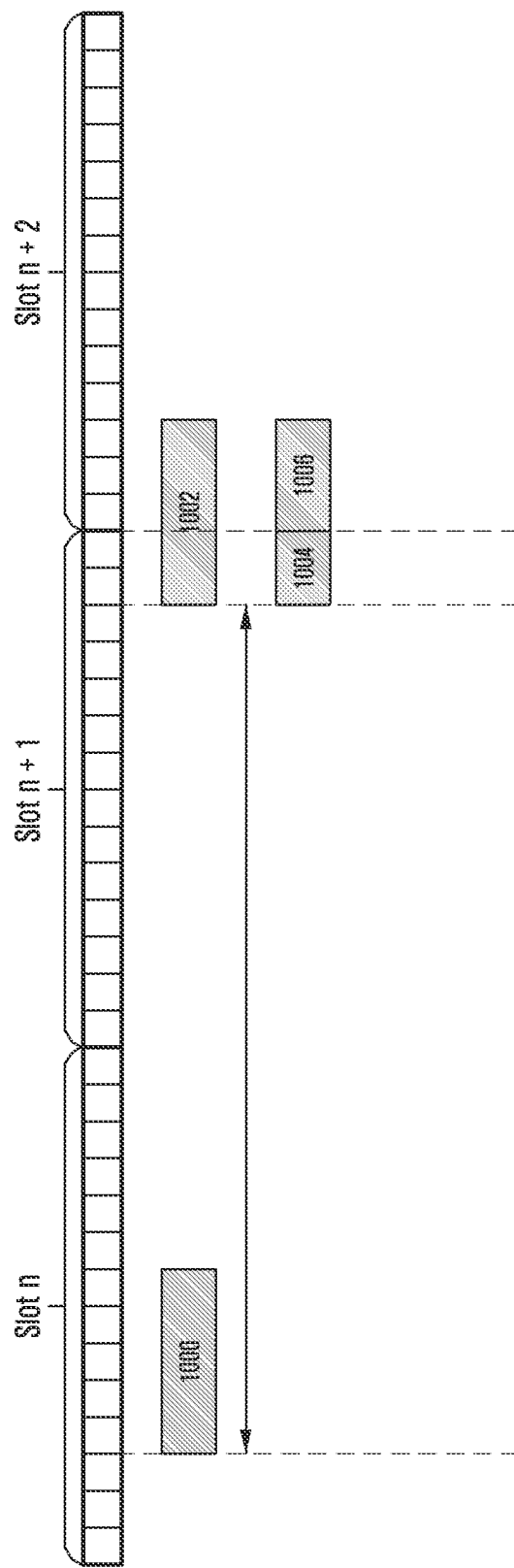
FIG. 10 is a diagram illustrating a situation in which a terminal and a base station periodically transmit and receive data according to an embodiment of the disclosure.

FIG. 10 is a diagram illustrating a situation in which a terminal and a base station periodically transmit and receive data according to an embodiment of the disclosure.

FIG. 10 illustrates a case in which the SPS PDSCH 1000 and the SPS PDSCH 1002 are resources for which data is periodically transmitted and received with the same SPS configuration, and the period of the SPS PDSCH 1000 and 1002 has a 24 symbol period. In conventional 5G NR, the minimum period of the SPS PDSCH is one slot (14 symbols in a normal cyclic prefix (NCP) and 12 symbols in an extended cyclic prefix (ECP)), and the period is set in units of slots with natural values, and each slot in which the SPS PDSCH is transmitted and received has the same transmission length and the same transmission start time. On the other hand, FIG. 10 illustrates a situation with a period other than one slot unit.

Meanwhile, the minimum transmission period of the UL CG is 2 symbols, unlike the SPS PDSCH, and in this case, the transmission length is not set to deviate from the next transmission period. That is, when the transmission period of the UL CG is 2 symbols, the maximum transmission length of the UL CG is limited to within 2 symbols. In FIG. 10, when the transmission period is not 1 slot unit in a situation where the transmission length of the SPS PDSCH 1000 and 1002 is set to 5 symbols, the case where the SPS PDSCH 1002 is allocated over the slot n+1 and the slot n+2 may occur, and when the base station and the terminal parallelly process control and data information in units of slots, there is a possibility that processing data scheduled beyond the slot boundary like the SPS PDSCH 1002 may increase the implementation burden. Accordingly, it may be possible to perform data transmission/reception by dividing the SPS PDSCH 1002 into the SPS PDSCH 1004 and the SPS PDSCH 1006, based on the slot boundary in FIG. 10.

In this case, the SPS PDSCH 1004 and the SPS PDSCH 1006 may be mapped by equally dividing one TB included in the SPS PDSCH 1002 by the amount of each allocated resource. Alternatively, regardless of this, the same TB may be repeatedly mapped to SPS PDSCH 1004 and SPS PDSCH 1006, respectively. In the former case, one TB is divided and mapped to SPS PDSCH 1004 and SPS PDSCH 1006, whereas in the latter case, one and the same TB is mapped to SPS PDSCH 1004 and SPS PDSCH 1006, respectively. The latter case can be understood as the same as repeated transmission.

Referring to FIG. 10, when the transmission resource of SPS PDSCH 1002 is divided into SPS PDSCH 1004 and SPS PDSCH 1006 and data is transmitted like the former or latter, a rule for determining a semi-static HARQ codebook (or Type 1 HARQ codebook) is newly required. In the semi-static HARQ codebook, as described above, the location of HARQ-ACK information in the semi-static HARQ codebook is determined, based on the difference (k1) information between the slot in which the PDSCH is transmitted/received and the PUCCH slot in which the HARQ-ACK information is transmitted/received in advance, and the position (i.e., based on starting and length information value (SLIV)) where the PDSCH can be scheduled in the slot in which the corresponding PDSCH is transmitted/received regardless of the DCI scheduling the PDSCH. Therefore, for SPS PDSCH 1002, when determining the location of the corresponding HARQ-ACK information in the semi-static HARQ codebook, there is a need to determine whether to use SPS PDSCH 1004 or SPS PDSCH 1006 as a reference.

In order to support faster HARQ-ACK feedback transmission, it may be reasonable to reference SPS PDSCH 1004. Alternatively, since the transmission end time of the SPS PDSCH 1002 is slot n+2, it may be reasonable to base the SPS PDSCH 1006 in consideration of the UE implementation (e.g., processing speed and processing time). It may be possible that either one of the two criteria is always defined in the standard to be used, or that one of the two criteria is configured according to a terminal capability or a higher signal or an L1 signal.

Referring to FIG. 10, it has been described as a representative when the SPS PDSCH 1002 is placed across a slot boundary, but the corresponding case may also be applied to a symbol in which a downlink symbol or an SS/PBCH block including a synchronization signal and master information block (MIB) information is transmitted and received, or a symbol assigned CORESET 0 for scheduling important system information, or information indicating the position of an invalid symbol allocated in advance as a higher signal in addition to a slot boundary or the like. In addition, although the description has been made based on the SPS PDSCH in FIG. 10, the HARQ-ACK feedback performed by the above-described method is sufficiently applicable to the PDSCH indicated by the DCI. In addition, the PDSCH can be applied to all of unicast, multicast, or broadcast PDSCH, or limitedly applied to PDSCHs of some cast types.

Figure 11:
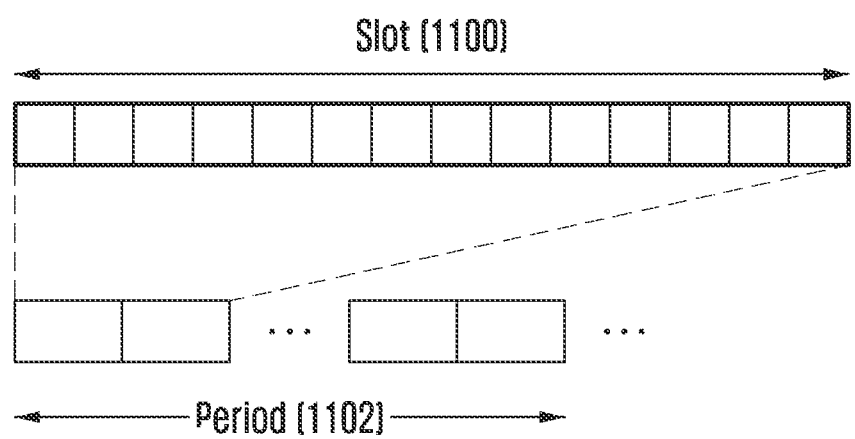
FIG. 11 is a diagram illustrating a method of notifying a transmission period of a DL SPS according to an embodiment of the disclosure.

FIG. 11 is a diagram illustrating an example of a method of notifying a transmission period of a DL SPS according to an embodiment of the disclosure.

Specifically, if the transmission period in the DL SPS was considered limited to the case where consecutive DL SPSs have the same transmission period, whether it is a natural number value or a positive integer (or rational number), FIG. 11 schematically illustrates a configuration method for supporting different transmission periods between DL SPSs. For example, in a situation in which DL SPS 1, DL SPS 2, and DL SPS 3 are scheduled in terms of time resources, the transmission interval between DL SPS 1 and DL SPS 2 may be 1 slot, and a transmission interval between DL SPS 2 and DL SPS 3 may be 2 slots. In FIG. 11, a bitmap 1100 indicating a symbol indicating a start position of a DL SPS within a specific slot for information indicating a DL SPS transmission period, and a bitmap with slot information 1102 indicating which slot is located within a specific section may be configurable. The information indicating the period may be transmitted through higher layer signaling and may be included in the DL SPS configuration information. For example, when "10000000000000" is indicated in 1100, the corresponding bitmap information means that the DL SPS is transmitted/received in the first symbol of the corresponding slot. As another example, when "10000000000100" is indicated in 1100, the corresponding bitmap information means that each DL SPS is transmitted/received in the first symbol and the twelfth symbol of the corresponding slot. In addition, it may be possible to set a limit so that the transmission length of one DL SPS cannot exceed the start symbol of the next DL SPS transmitted and received.

The bitmap information described in the example of 1100 may not be applied to all slots, but may indicate to which slot among a set of a specific number of slots the DL SPS indicated by the bitmap is allocated. For example, it may be possible for the DL SPS start position indicated by 1100 to be applied in the first slot and the fourth slot every five slot periods when 1102 is a bitmap of "10010" in a situation with a period consisting of five slots. As another example, when the information of 1100 is not separately or is not indicated, it may be possible for the DL SPS to exist in each slot indicated in 1102 according to the SLIV value indicating activation of the DL SPS. The number of slots included in the set of slots that can be indicated in 1102 may be other values other than the example described as 5, and it may be possible to indicate in units of ms (milliseconds) or s (seconds) rather than in units of slots.

As another example, in 1100, it may be possible to inform the transmission length as well as the transmission start symbol position of each DL SPS. For example, when "11111100000000" is indicated, it may be possible to indicate that the DL SPS is located in the first symbol in the corresponding slot and has a length of 6 symbols. In this case, it may be possible to limit the number of DL SPSs that can be indicated for each corresponding slot to one or two or less. In addition, in 1100, the bitmap size may be composed of 14 bitmaps in the case of NCP and 12 bitmaps in the case of ECP. Alternatively, in 1100, it may be possible for one bit value to inform information about two or more symbols. In this case, a value less than 14 bits is possible in NCP, and a value less than 12 bits in ECP is possible. For example, if 1100 contains n bits, in the case of NCP $$14 - \left\lfloor \frac{14}{n} \right\rfloor \times n \text{ bits}$$

bits among n bits may correspond to $\lceil 14/n \rceil$ symbols, and $$n - \left(14 - \left\lfloor \frac{14}{n} \right\rfloor \times n\right)$$

bits may correspond to $\lfloor 14/n \rfloor$ symbols. In the case of ECP, 14 may be transformed into 12 and applied.

Alternatively, a bitmap including symbol information indicating different DL SPS start positions may be indicated for each slot indicated in 1102. For example, when "10010" is indicated in 1102, different values may be applied to the bitmap information value 1100 in the slots indicated by the first 1 and the second 1. That is, the transmission start symbol (and length) of the DL SPS indicated in each slot by the different bitmap information values may be the same or different. As an example, when the bitmap information value 1100 for the first slot indicated by 1 consists of 14 bits, and 11111100000000 is indicated, it indicates that the SPS PDSCH having a length of 6 symbols is allocated starting from the first symbol in the corresponding slot. In addition, when the bitmap information 1100 for the second slot indicated by 1 is composed of another 14 bits, and 00111111000000 is indicated, it indicates that the SPS PDSCH having a length of 6 symbols is allocated starting from the 3rd symbol in the corresponding slot. Although the example of indicating the start symbol and length of the SPS PDSCH with the 14 bitmaps has been described, the method in which the above-described start symbol and length are expressed as a function and indicated in the form of SLIV may also be applicable, and the corresponding SLIV value may have a different value for each slot indicated at 1102.

Alternatively, in 1102, the number of slots indicated by each bit included in the bitmap may be one or two or more specific natural numbers. Alternatively, each bit included in 1102 may correspond to a specific time unit. Alternatively, in 1102, the bit size is fixed, and it may be possible for a period value other than that to be indicated by another higher signal setting in a combination of at least one of the number of slots, the number of frames, or the time unit. In this case, the slot or time unit indicated by one bit may be different.

Alternatively, based on slot format information indicating whether the corresponding symbol is a downlink symbol, an uplink symbol, or a flexible link symbol based on the bit information, in the case of DL SPS, it may be possible to consider that the DL SPS resource is configured in consideration of only a downlink symbol or a flexible link symbol. Alternatively, in the case of UL CG, it may be possible to consider that the UL CG resource is configured in consideration of only an uplink symbol or a flexible link symbol. The slot format information may be indicated based on a common or UE-specific higher-level signal or an L1 signal.

Figure 12:
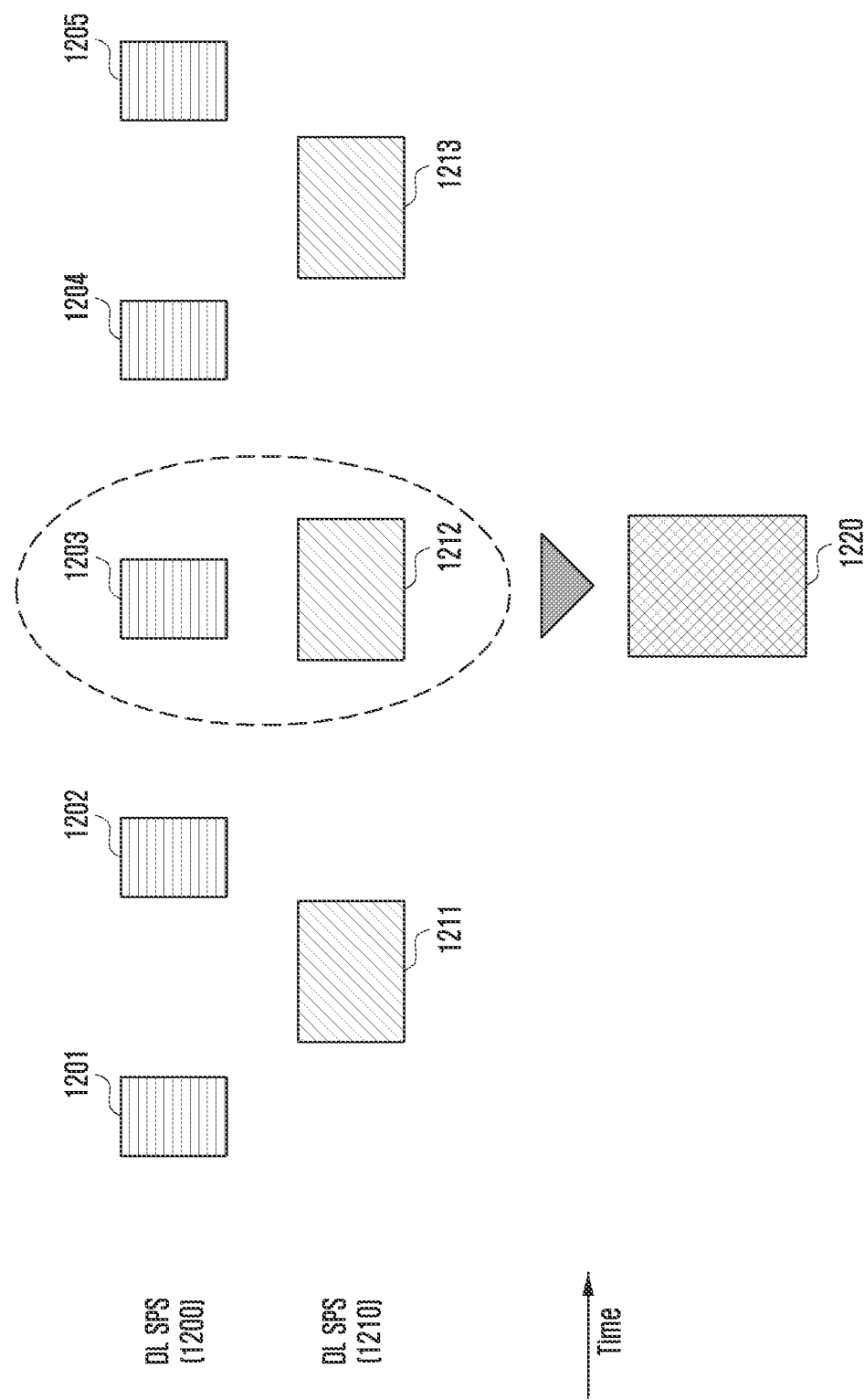
FIG. 12 is a diagram illustrating an example of a situation in which a plurality of DL SPSs are set according to an embodiment of the disclosure.

FIG. 12 is a diagram illustrating an example of a situation in which a plurality of DL SPSs are set according to an embodiment of the disclosure.

The terminal may be able to receive a plurality of DL SPSs configured in one cell or one BWP according to terminal capability and base station configuration. It may be possible for each DL SPS configuration to have an independent time resource, frequency resource, MCS, RV, TBS and transmission period. FIG. 12 illustrates a situation in which two DL SPSs 1200 and 1210 are configured and activated. The terminal and the base station may transmit/receive data in a given resource region according to each DL SPS configuration. When each DL SPS setting does not overlap in terms of a specific time resource, the UE will receive SPS PDSCHs 1201, 1202, 1203, 1204, 1205, 1211, 1212, and 1213 configured according to DL SPS 1200 and 1210 and report HARQ-ACK information for them through a PUCCH resource configured in advance.

Referring to FIG. 12, the SPS PDSCH 1203 of DL SPS 1200 and the SPS PDSCH 1212 of DL SPS 1210 may overlap at least one symbol from the viewpoint of time resources. If the UE has the ability to process a plurality of PDSCHs at the same time, it may be possible to simultaneously receive and process the SPS PDSCH 1203 and the SPS PDSCH 1212 in FIG. 12, and then report HARQ-ACK information. However, if the UE has the ability to process only one PDSCH at a specific time, the terminal should select only one SPS PDSCH from among the SPS PDSCH 1203 and the SPS PDSCH 1212. In this case, it may be possible for the UE to receive only the SPS PDSCH corresponding to the lowest or highest SPS PDSCH index value. Other SPS PDSCHs are not received by the UE. In addition, since the SPS PDSCHs follow a preset transmission period and resource, it may be possible for the base station to utilize the resource of the SPS PDSCH that the terminal cannot receive as a resource region for transmitting and receiving control information or data information for other terminals.

However, in a service in which transmission delay and reliability as well as transmission speed are important, such as the XR service, receiving only one of the SPS PDSCH 1203 and the SPS PDSCH 1212 may cause a big problem. For example, if the XR service is information indicating image information about a building or a specific object on a specific background screen, such as AR glass, DL SPS 1200 may be information about the background screen that is periodically transmitted and received, and DL SPS 1210 may indicate information on a specific object overlaid on the background. Accordingly, in this case, receiving only one of the information of the SPS PDSCH 1203 and the SPS PDSCH 1212 means that only some of the information is received at a specific time, so there is a possibility that a user using the XR service may feel a low level of reality due to data transmission interruption.

Therefore, in order to solve this problem, when the SPS PDSCH 1203 and the SPS PDSCH 1212 overlap in terms of time resources as shown in FIG. 12, the third SPS PDSCH 1220 is configured, so that the UE may be able to receive data to be received in the SPS PDSCH 1203 and the SPS PDSCH 1212 through the SPS PDSCH 1220. Accordingly, the UE may be able to receive one SPS PDSCH 1220 in terms of time resources. As a factor for determining the SPS PDSCH 1220 transmission resource, at least one or a combination of time and frequency resources configured in each SPS PDSCH 1203 and 1212, TBS, MCS, RV, and NDI may correspond.

Alternatively, there may be transmission resource regions preset for the transmission resource of the SPS PDSCH 1220, and the resource of the SPS PDSCH 1220 may be determined through a combination of at least one of the above elements. As an example, the set of transmission resources of the SPS PDSCH 1220 may be preconfigured to a total of N, and the factor for selecting one of the N transmission resources may be determined as at least one or a combination of two or more of time and frequency resources configured in the overlapping SPS PDSCHs 1203 and 1212, TBS, MCS, RV, and NDI.

Considering the TBS as an example, the transmission resource of the SPS PDSCH 1220 may be determined according to the size of the TBS. In this case, the size of the TBS may be the sum of the TBSs scheduled in the SPS PDSCHs 1203 and 1212, respectively, or the sum of the TBSs without considering the CRC. If the number of sets of transmission resources for the SPS PDSCH 1220 is three and each of SPS PDSCH1, SPS PDSCH2, and SPS PDSCH3 resources are set in advance, which resource will be selected may be determined according to the sum of the calculated TBS sizes. If the sum of the corresponding sizes is smaller than T1, the UE may select SPS PDSCH1, when it is larger than T1 but smaller than T2, the UE may select SPS PDSCH2, and when it is larger than T2, the UE select SPS PDSCH3. The T1 and T2 are threshold values for selecting a specific SPS PDSCH resource, and it may be possible to set the higher signal in advance. In this case, the size of the TBS transmitted and received in the actual SPS PDSCH 1220 is not the sum of the TBSs of the SPS PDSCHs 1203 and 1212, but may be determined based on a value set as a higher signal in the SPS PDSCH 1220 in advance. The method of selecting the SPS PDSCH based on the TBS is only an example, and the disclosure is not limited to this example.

At this time, the PUCCH resource through which the HARQ information for the changed SPS PDSCH 1220 is transmitted may be determined according to the last selected SPS PDSCH 1220, or may be determined as the PUCCH resource for the SPS PDSCH 1203 or the SPS PDSCH 1212. Which PUCCH resource is to be used is explicitly indicated by a higher signal or L1 signal, and the PUCCH resource for the earliest, latest, longest, or shortest SPS PDSCH may be selected according to the comparison of the start point, end point, or length of the SPS PDSCH resource implicitly of the SPS PDSCH transmission resource. Alternatively, PUCCH resources related to a specific SPS PDSCH may be determined according to the SPS index of the SPS PDSCH. For example, if there is a first PUCCH resource for the first SPS PDSCH and a second PUCCH resource for the second SPS PDSCH, when the first SPS PDSCH is transmitted and received first in a situation where the first SPS PDSCH resource and the second SPS PDSCH resource overlap, the UE may determine to transmit HARQ information through the first PUCCH resource.

Alternatively, when the SPS PDSCH 1203 and the SPS PDSCH 1212 in FIG. 12 overlap in time resources, the UE may be able to determine that one TB is divided and mapped to the SPS PDSCH 1203 and the SPS PDSCH 1212.

Conventionally, code rate, modulation order, time and frequency resources, number of layers, etc. applied to TB1 for SPS PDSCH 1203 and TB2 for SPS PDSCH 1212 may be the same or different according to each SPS PDSCH configuration. When these two SPS PDSCHs overlap in terms of time resources, it may be possible to receive them as one TB because simultaneous reception of different TBs is not allowed from the viewpoint of the UE. At this time, when at least one of configuration information for data reception such as a code rate or a modulation order or layer applied to each SPS PDSCH is different, the UE may determine that the information of the lowest or highest value is applied. For example, when the SPS PDSCH 1203 is transmitted using two layers, and the SPS PDSCH 1212 is transmitted using one layer, the UE may determine that both the SPS PDSCH 1203 and the SPS PDSCH 1212 are received using one layer. Alternatively, it is possible that these restrictions do not apply. In this case, the UE may determine that one TB is mapped to the existing SPS PDSCH 1203 and the SPS PDSCH 1212 without changing time and frequency resources and may be able to receive the same.

Alternatively, when the SPS PDSCH 1203 and the SPS PDSCH 1212 overlap in terms of time resources in FIG. 12, the UE may consider that the two SPS PDSCHs repeatedly transmit the same data. That is, even if the SPS PDSCH 1203 and the SPS PDSCH 1212 have different code rates, modulation orders, number of layers, and time and frequency resource sizes, the UE regards the same data as repeated transmission and receives them.

Figure 13:
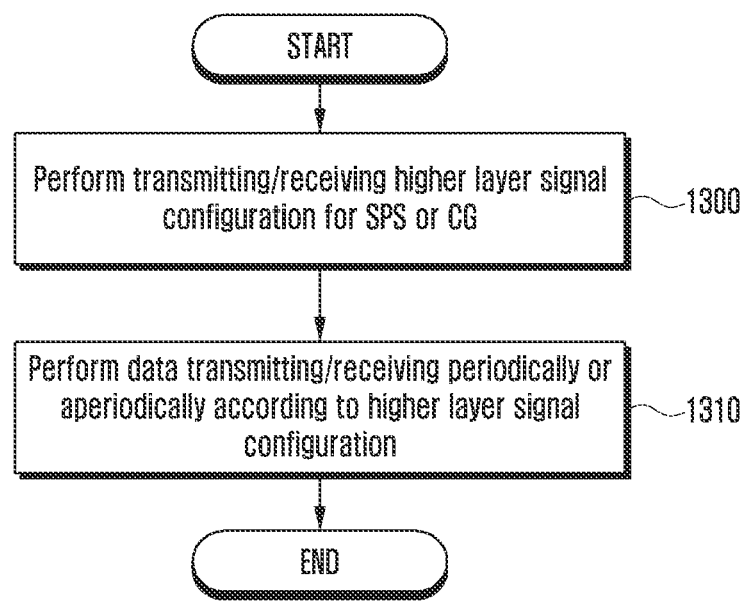
FIG. 13 is a flowchart illustrating operations of a terminal and a base station according to an embodiment of the disclosure.

FIG. 13 is a flowchart illustrating operations of a terminal and a base station according to an embodiment of the disclosure.

Referring to FIG. 13, the base station transmits higher signal configuration information (and/or downlink control information related to SPS configuration) for SPS or CG to the terminal, and the terminal determines data reception information such as a transmission period for SPS or CG or a resource region to which data is allocated, TBS, and RV after receiving the higher signal configuration information (and/or downlink control information related to the SPS configuration) at operation 1300. In addition, the configuration information may include at least one of the configuration information described above with reference to FIGS. 9 to 12, and the UE may determine resource region information for receiving SPS PDSCHs, and follows the operation described with reference to FIGS. 9 to 12, based on the corresponding setting information. Thereafter, the base station transmits at least one of the configuration information described above with reference to FIGS. 9 to 12, and then periodically or aperiodically transmits the SPS PDSCH or receives the UL CG PUSCH based on the corresponding information. After receiving at least one of the configuration information described above in FIGS. 9 to 12, the terminal periodically or aperiodically receives the SPS PDSCH or transmits the UL CG PUSCH based on the information at operation 1310.

Figure 14:
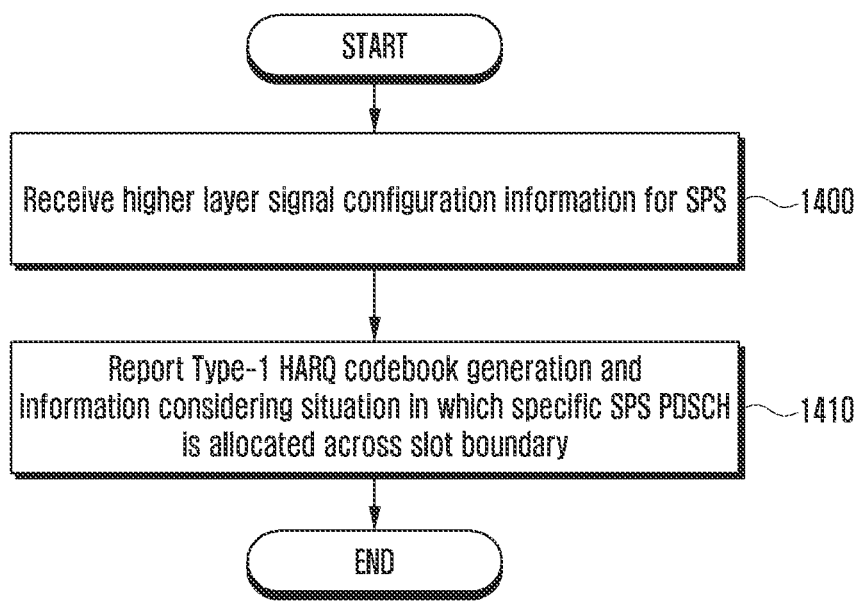
FIG. 14 is a flowchart illustrating operations of a terminal and a base station according to an embodiment of the disclosure.

FIG. 14 is a flowchart illustrating operations of a terminal and a base station according to an embodiment of the disclosure.

Referring to FIG. 10, when the terminal is configured from the base station so that a situation in which the SPS PDSCH crosses the slot boundary occurs according to the SPS higher signal configuration (and/or downlink control information related to the SPS configuration), and configured from the base station to report HARQ-ACK information in a semi-static HARQ codebook at operation 1400, the UE reports location information for semi-static HARQ reporting for the SPS PDSCH based on the method described in FIG. 10 at operation 1410. After determining the location of the HARQ information reported by the terminal in advance based on the method described with reference to FIG. 10, the base station may determine whether the SPS PDSCH transmission is successful or not by receiving the corresponding HARQ information.

Figure 15:
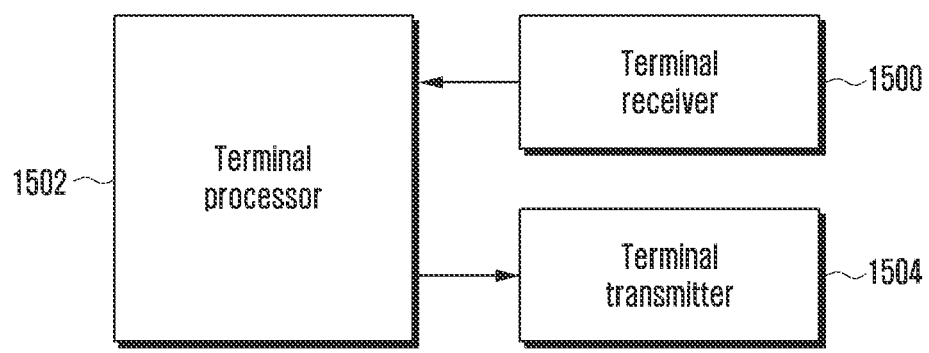
FIG. 15 is a block diagram illustrating the structure of a terminal capable of performing according to an embodiment of the disclosure.

FIG. 15 is a block diagram illustrating the structure of a terminal capable of performing according to an embodiment of the disclosure.

Referring to FIG. 15, the terminal of the disclosure may include a terminal receiver 1500, a terminal transmitter 1504, and a terminal processor 1502. The terminal receiver 1500 and the terminal transmitter 1504 may be collectively referred to as a transceiver in the embodiment. The transceiver may transmit/receive a signal to/from the base station. The signal may include control information and data. To this end, the transceiver may include an RF transmitter for up-converting and amplifying a frequency of a transmitted signal, and an RF receiver for low-noise amplifying and down-converting a received signal. In addition, the transceiver may receive a signal through the wireless channel and output the same to the terminal processor 1502, and transmit the signal output from the terminal processor 1502 through the wireless channel. The terminal processor 1502 may control a series of processes so that the terminal can operate according to the above-described embodiment.

Figure 16:
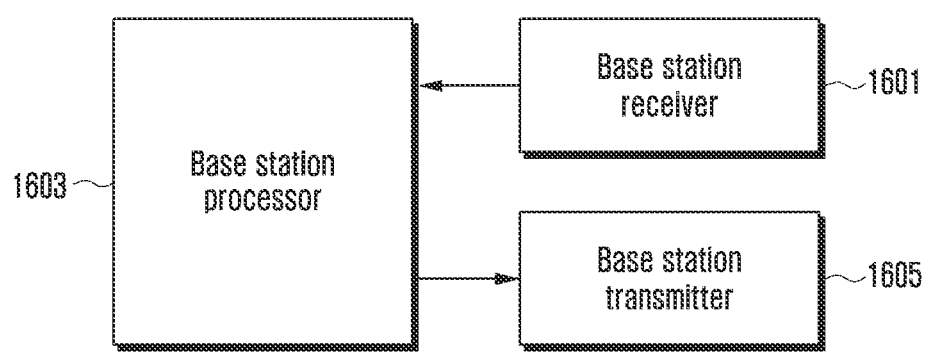
FIG. 16 is a block diagram illustrating a structure of a base station capable of performing according to an embodiment of the disclosure.

FIG. 16 is a block diagram illustrating a structure of a base station capable of performing according to an embodiment of the disclosure.

Referring to FIG. 16, the base station may include at least one of a base station receiver 1601, a base station transmitter 1605, and a base station processor 1603. The base station receiver 1601 and the base station transmitter 1605 may be collectively referred to as a transceiver in the embodiment of the disclosure. The transceiver may transmit/receive a signal to/from the terminal. The signal may include control information and data. To this end, the transceiver may include an RF transmitter for up-converting and amplifying a frequency of a transmitted signal, and an RF receiver for low-noise amplifying and down-converting a received signal. In addition, the transceiver may receive a signal through a wireless channel and output it to the base station processor 1603, and transmit the signal output from the terminal processor 1603 through the wireless channel. The base station processor 1603 may control a series of processes so that the base station can operate according to the above-described embodiment of the disclosure.

In the drawings in which methods of the disclosure are described, the order of the description does not always correspond to the order in which steps of each method are performed, and the order relationship between the steps may be changed or the steps may be performed in parallel. Alternatively, in the drawings in which methods of the disclosure are described, some elements may be omitted and only some elements may be included therein without departing from the essential spirit and scope of the disclosure.

Although the disclosure has mainly described the UE operation for the SPS PDSCH, it may be sufficiently applicable to equally apply to the grant-free PUSCH (or configured grant type 1 and type 2).

Furthermore, in the methods of the disclosure, some or all of the contents of each embodiment may be combined without departing from the essential spirit and scope of the disclosure.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary. For example, multiple embodiments of the disclosure may be partially combined to operate a base station and a terminal. Furthermore, although the above embodiments have been described by way of the NR system, other variants based on the technical idea of the embodiments may be implemented in other systems such as FDD or time division duplex (TDD) LTE systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:
receiving, from a base station, a semi-persistent scheduling (SPS) configuration for data packets that do not correspond to a period of a multiple of a symbol interval, the SPS configuration including information on a period of a SPS physical downlink shared channel (PDSCH);
receiving, from the base station, downlink control information for activation of the SPS configuration;
identifying a resource for the SPS PDSCH based on the information on the SPS PDSCH; and
receiving, from the base station, data packet on the resource,
wherein in case that the period of the SPS PDSCH is not the multiple of the symbol interval, a start point and an end point of the identified resource is aligned to a symbol boundary,
wherein the start point and the end point of the identified resource is based on a time domain resource after a value of the period from a last SPS PDSCH resource, and wherein:
the start point of the identified resource is a start point of a first symbol that includes a start point of the time domain resource or a start point of a next symbol of the first symbol, or
the end point of the identified resource is an end point of a second symbol that includes an end point of the time domain resource or an end point of a symbol before the second symbol.

2. The method of claim 1,
wherein the information on the period includes at least one of a first bitmap or a second bitmap,
wherein the first bitmap indicates a time-domain resource for the SPS PDSCH in a slot, and
wherein the second bitmap indicates at least one slot in which the time-domain resource for the SPS PDSCH is allocated among a plurality of slots.

3. The method of claim 1, wherein the downlink control information indicates the period of the SPS PDSCH among preconfigured periods for the SPS PDSCH.

4. A method performed by a base station in a communication system, the method comprising:
transmitting, to a terminal, a semi-persistent scheduling (SPS) configuration for data packets that do not correspond to a period of a multiple of a symbol interval, the SPS configuration including information on a period of a SPS physical downlink shared channel (PDSCH);
transmitting, to the terminal, downlink control information for activation of the SPS configuration; and
transmitting, to the terminal, data packet on a resource for the SPS PDSCH,
wherein the resource for the SPS PDSCH is based on the information on the SPS PDSCH,
wherein in case that the period of the SPS PDSCH is not the multiple of the symbol interval, a start point and an end point of the resource is aligned to a symbol boundary,
wherein the start point and the end point of the resource is based on a time domain resource after a value of the period from a last SPS PDSCH resource, and
wherein:
the start point of the resource is a start point of a first symbol that includes a start point of the time domain resource or a start point of a next symbol of the first symbol, or
the end point of the resource is an end point of a second symbol that includes an end point of the time domain resource or an end point of a symbol before the second symbol.

5. The method of claim 4,
wherein the information on the period includes at least one of a first bitmap or a second bitmap,
wherein the first bitmap indicates a time-domain resource for the SPS PDSCH in a slot, and
wherein the second bitmap indicates at least one slot in which the time-domain resource for the SPS PDSCH is allocated among a plurality of slots.

6. The method of claim 4, wherein the downlink control information indicates the period of the SPS PDSCH among preconfigured periods for the SPS PDSCH.

7. A terminal in a communication system, the terminal comprising:
a transceiver; and
a controller coupled with the transceiver and configured to:
receive, from a base station, a semi-persistent scheduling (SPS) configuration for data packets that do not correspond to a period of a multiple of a symbol interval, the SPS configuration including information on a period of a SPS physical downlink shared channel (PDSCH),
receive, from the base station, downlink control information for activation of the SPS configuration,
identify a resource for the SPS PDSCH based on the information on the SPS PDSCH, and
receive, from the base station, data packet on the resource,
wherein in case that the period of the SPS PDSCH is not the multiple of the symbol interval, a start point and an end point of the identified resource is aligned to a symbol boundary,
wherein the start point and the end point of the identified resource is based on a time domain resource after a value of the period from a last SPS PDSCH resource, and
wherein:
the start point of the identified resource is a start point of a first symbol that includes a start point of the time domain resource or a start point of a next symbol of the first symbol, or
the end point of the identified resource is an end point of a second symbol that includes an end point of the time domain resource or an end point of a symbol before the second symbol.

8. The terminal of claim 7,
wherein the information on the period includes at least one of a first bitmap or a second bitmap,
wherein the first bitmap indicates a time-domain resource for the SPS PDSCH in a slot, and
wherein the second bitmap indicates at least one slot in which the time-domain resource for the SPS PDSCH is allocated among a plurality of slots.

9. The terminal of claim 7, wherein the downlink control information indicates the period of the SPS PDSCH among preconfigured periods for the SPS PDSCH.

10. A base station in a communication system, the base station comprising:
a transceiver; and
a controller coupled with the transceiver and configured to:
transmit, to a terminal, a semi-persistent scheduling (SPS) configuration for data packets that do not correspond to a period of a multiple of a symbol interval, the SPS configuration including information on a period of a SPS physical downlink shared channel (PDSCH),
transmit, to the terminal, downlink control information for activation of the SPS configuration, and
transmit, to the terminal, data packet on a resource for the SPS PDSCH,
wherein the resource for the SPS PDSCH is based on the information on the SPS PDSCH,
wherein in case that the period of the SPS PDSCH is not the multiple of the symbol interval, a start point and an end point of the resource is aligned to a symbol boundary,
wherein the start point and the end point of the resource is based on a time domain resource after a value of the period from a last SPS PDSCH resource, and
wherein:
the start point of the resource is a start point of a first symbol that includes a start point of the time domain resource or a start point of a next symbol of the first symbol, or the end point of the resource is an end point of a second symbol that includes an end point of the time domain resource or an end point of a symbol before the second symbol.

11. The base station of claim 10,
wherein the information on the period includes at least one of a first bitmap or a second bitmap,
wherein the first bitmap indicates a time-domain resource for the SPS PDSCH in a slot, and
wherein the second bitmap indicates at least one slot in which the time-domain resource for the SPS PDSCH is allocated among a plurality of slots.

12. The base station of claim 10, wherein the downlink control information indicates the period of the SPS PDSCH among preconfigured periods for the SPS PDSCH.

* * * * *